(12) United States Patent
Volvovski et al.

(10) Patent No.: US 8,832,493 B2
(45) Date of Patent: Sep. 9, 2014

(54) STORING DIRECTORY METADATA IN A DISPERSED STORAGE NETWORK

(75) Inventors: Ilya Volvovski, Chicago, IL (US); Andrew Baptist, Chicago, IL (US); Wesley Leggette, Oak Park, IL (US)

(73) Assignee: Cleversafe, Inc., Chicago, IL (US)

( * ) Notice: Subject to any disclaimer, the term of this patent is extended or adjusted under 35 U.S.C. 154(b) by 238 days.

(21) Appl. No.: 13/308,724

(22) Filed: Dec. 1, 2011

(65) Prior Publication Data

US 2012/0166867 A1 Jun. 28, 2012

Related U.S. Application Data

(60) Provisional application No. 61/426,237, filed on Dec. 22, 2010.

(51) Int. Cl.
*G06F 11/00* (2006.01)
*G06F 17/30* (2006.01)

(52) U.S. Cl.
CPC ..................................... *G06F 17/30* (2013.01)
USPC ............................................. 714/6.24; 711/4

(58) Field of Classification Search
USPC ........................................................ 714/6.24
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Kamini Patel
(74) *Attorney, Agent, or Firm* — Garlick & Markison; Jessica W. Smith

(57) ABSTRACT

A method begins by a processing module dispersed storage error encoding data to produce encoded data slices and updating directory metadata regarding storing the data in a dispersed storage network (DSN) memory to produce updated directory metadata. The method continues with the processing module dispersed storage error encoding the updated directory metadata to produce encoded directory metadata slices and transmitting one or more data slice write requests to the DSN that each include a first transaction number. The method continues with the processing module transmitting one or more directory metadata write requests to the DSN memory, wherein the one or more directory metadata write requests includes a second transaction number, and when a favorable write response condition exists, transmitting a commit request to the DSN memory to commit storage of at least one of: the encoded data slices and the encoded directory metadata slices.

14 Claims, 28 Drawing Sheets

(56) References Cited

U.S. PATENT DOCUMENTS

| | | | |
|---|---|---|---|
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,281,182 B2 * | 10/2012 | Resch et al. | 714/6.2 |
| 8,357,048 B2 * | 1/2013 | Grube et al. | 463/43 |
| 8,479,078 B2 * | 7/2013 | Resch et al. | 714/763 |
| 8,489,915 B2 * | 7/2013 | Dhuse et al. | 714/6.22 |
| 8,516,299 B2 * | 8/2013 | Resch et al. | 714/6.2 |
| 2002/0062422 A1 | 5/2002 | Butterworth et al. | |
| 2002/0103811 A1 * | 8/2002 | Fankhauser et al. | 707/104.1 |
| 2002/0166079 A1 * | 11/2002 | Ulrich et al. | 714/6 |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 * | 4/2007 | Gladwin et al. | 711/154 |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0029711 A1 * | 2/2011 | Dhuse et al. | 711/4 |
| 2011/0029809 A1 * | 2/2011 | Dhuse et al. | 714/6 |
| 2011/0035356 A1 * | 2/2011 | Vukojevic | 707/615 |
| 2011/0072210 A1 * | 3/2011 | Dhuse | 711/114 |
| 2011/0107165 A1 * | 5/2011 | Resch et al. | 714/746 |
| 2011/0107185 A1 * | 5/2011 | Grube et al. | 714/768 |
| 2011/0161681 A1 * | 6/2011 | Dhuse et al. | 713/193 |
| 2011/0161754 A1 * | 6/2011 | Baptist et al. | 714/718 |
| 2011/0225466 A1 * | 9/2011 | Resch et al. | 714/54 |
| 2012/0324275 A1 * | 12/2012 | Resch et al. | 714/6.2 |
| 2013/0013958 A1 * | 1/2013 | Leggette | 714/6.2 |
| 2013/0102395 A1 * | 4/2013 | Grube et al. | 463/42 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

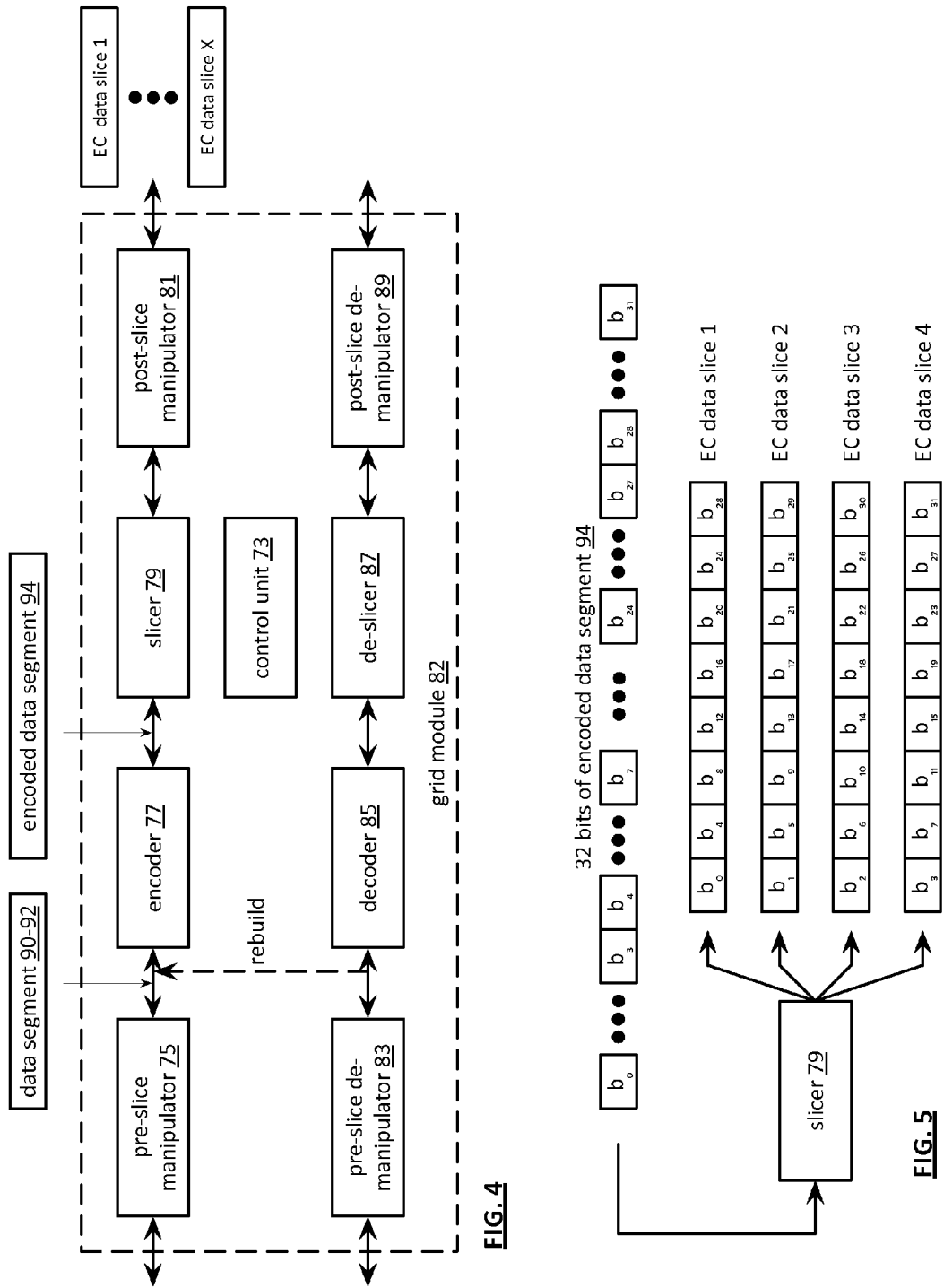

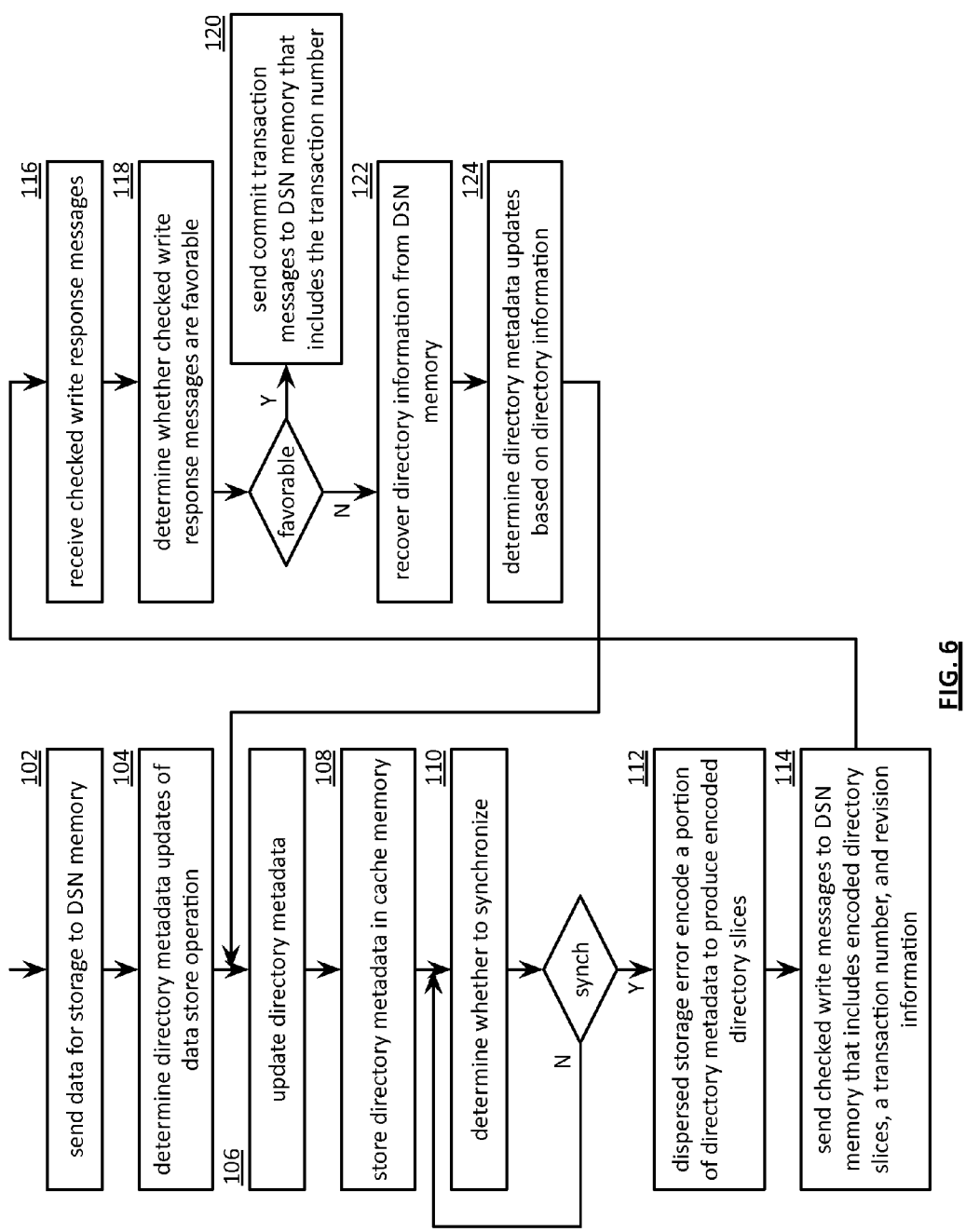

FIG. 10A

| snapshot file 160 | | |
|---|---|---|
| parent snapshot 164 | children 166 | timestamp 168 |
| root | - | t=0 |

| root directory file 162 |
|---|
| root: ip.txt |
| root: CS289.doc |

FIG. 10B

| snapshot file 160 | | |
|---|---|---|
| parent snapshot 164 | children 166 | timestamp 168 |
| root | - | t=0 |

| root directory file 170 |
|---|
| root: ip.txt |
| root: CS289.doc |
| root: CS281.doc |

FIG. 10C

| snapshot file 172 | | |
|---|---|---|
| parent snapshot 176 | children 178 | timestamp 180 |
| root | foo | t=0 |
| foo | - | t=2 |

| root directory file 170 |
|---|
| root: ip.txt |
| root: CS289.doc |
| root: CS281.doc |

| foo directory file 174 |
|---|
| root: ip.txt |
| root: CS289.doc |
| root: CS281.doc |

FIG. 10D

| snapshot file 172 | | |
|---|---|---|
| parent snapshot 176 | children 178 | timestamp 180 |
| root | foo | t=0 |
| foo | - | t=2 |

| root directory file 170 |
|---|
| root: ip.txt |
| root: CS289.doc |
| root: CS281.doc |

| foo directory file 182 |
|---|
| foo: ip.txt |
| foo: CS289.doc |
| foo: CS281.doc |

FIG. 10E

| snapshot file 172 | | |
|---|---|---|
| parent snapshot 176 | children 178 | timestamp 180 |
| root | foo | t=0 |
| foo | - | t=2 |

| root directory file 184 |
|---|
| root: CS289.doc |
| root: CS281.doc |

| foo directory file 182 |
|---|
| foo: ip.txt |
| foo: CS289.doc |
| foo: CS281.doc |
| foo: CS400.doc |

FIG. 10F

| snapshot file 172 | | |
|---|---|---|
| parent snapshot 176 | children 178 | timestamp 180 |
| root | foo | t=0 |
| foo | - | t=2 |

| root directory file 186 |
|---|
| root: CS289.doc |
| root: CS281.doc |
| root: blah.txt |

| foo directory file 182 |
|---|
| foo: ip.txt |
| foo: CS289.doc |
| foo: CS281.doc |
| foo: CS400.doc |

FIG. 10G

| snapshot file 188 | | |
|---|---|---|
| parent snapshot 192 | children 194 | timestamp 196 |
| root | foo | t=0 |
| foo | bar | t=2 |
| bar | - | t=6 |

| root directory file 186 |
|---|
| root: CS289.doc |
| root: CS281.doc |
| root: blah.txt |

| foo directory file 182 |
|---|
| foo: ip.txt |
| foo: CS289.doc |
| foo: CS281.doc |
| foo: CS400.doc |

| bar directory file 190 |
|---|
| bar: ip.txt |
| bar: CS289.doc |
| bar: CS281.doc |
| bar: CS400.doc |
| bar: blah.txt |

FIG. 10H

| snapshot file 188 | | |
|---|---|---|
| parent snapshot 192 | children 194 | timestamp 196 |
| root | foo | t=0 |
| foo | bar | t=2 |
| bar | - | t=6 |

| root directory file 186 |
|---|
| root: CS289.doc |
| root: CS281.doc |
| root: blah.txt |

| foo directory file 182 |
|---|
| foo: ip.txt |
| foo: CS289.doc |
| foo: CS281.doc |
| foo: CS400.doc |

| bar directory file 198 |
|---|
| bar: ip.txt |
| bar: CS289.doc |
| bar: CS281.doc |
| bar: CS400.doc |
| bar: blah.txt |
| bar: cs500.doc |

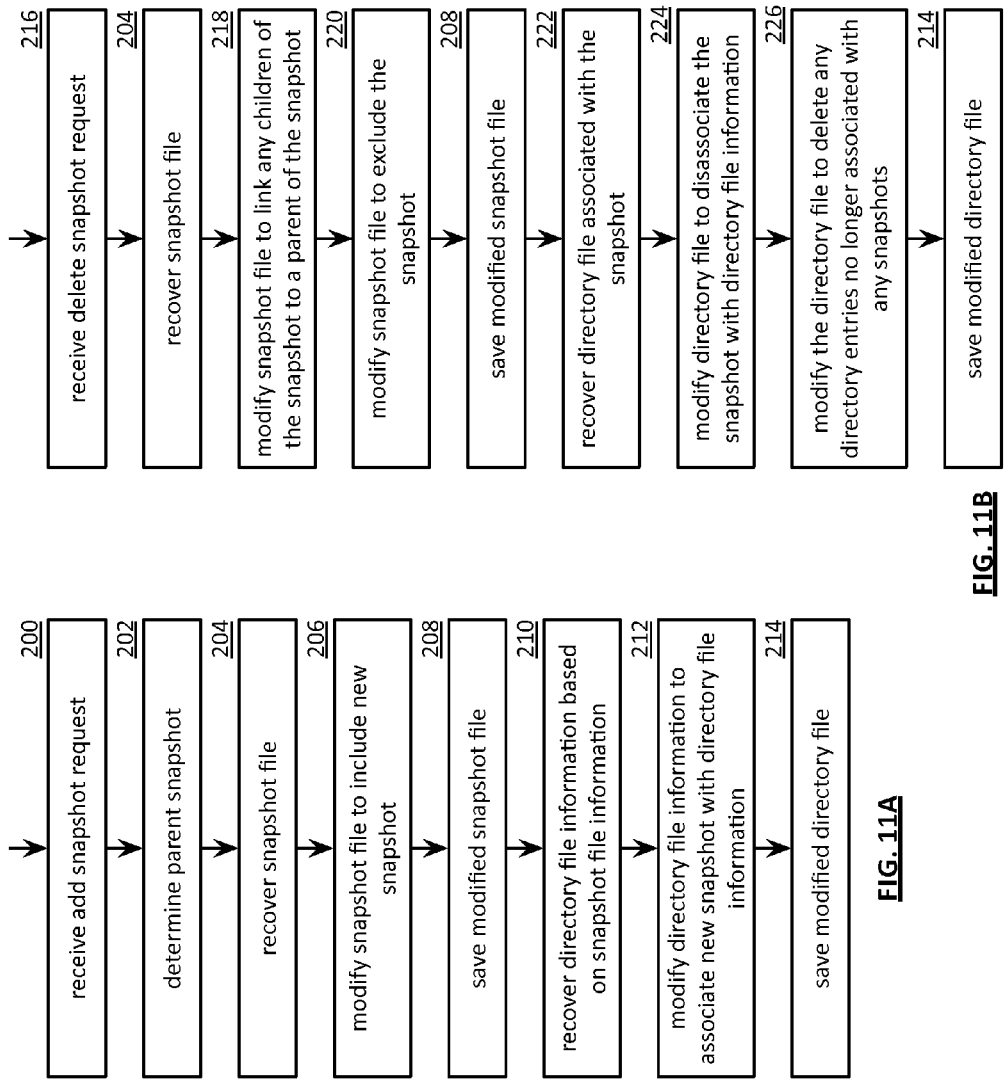

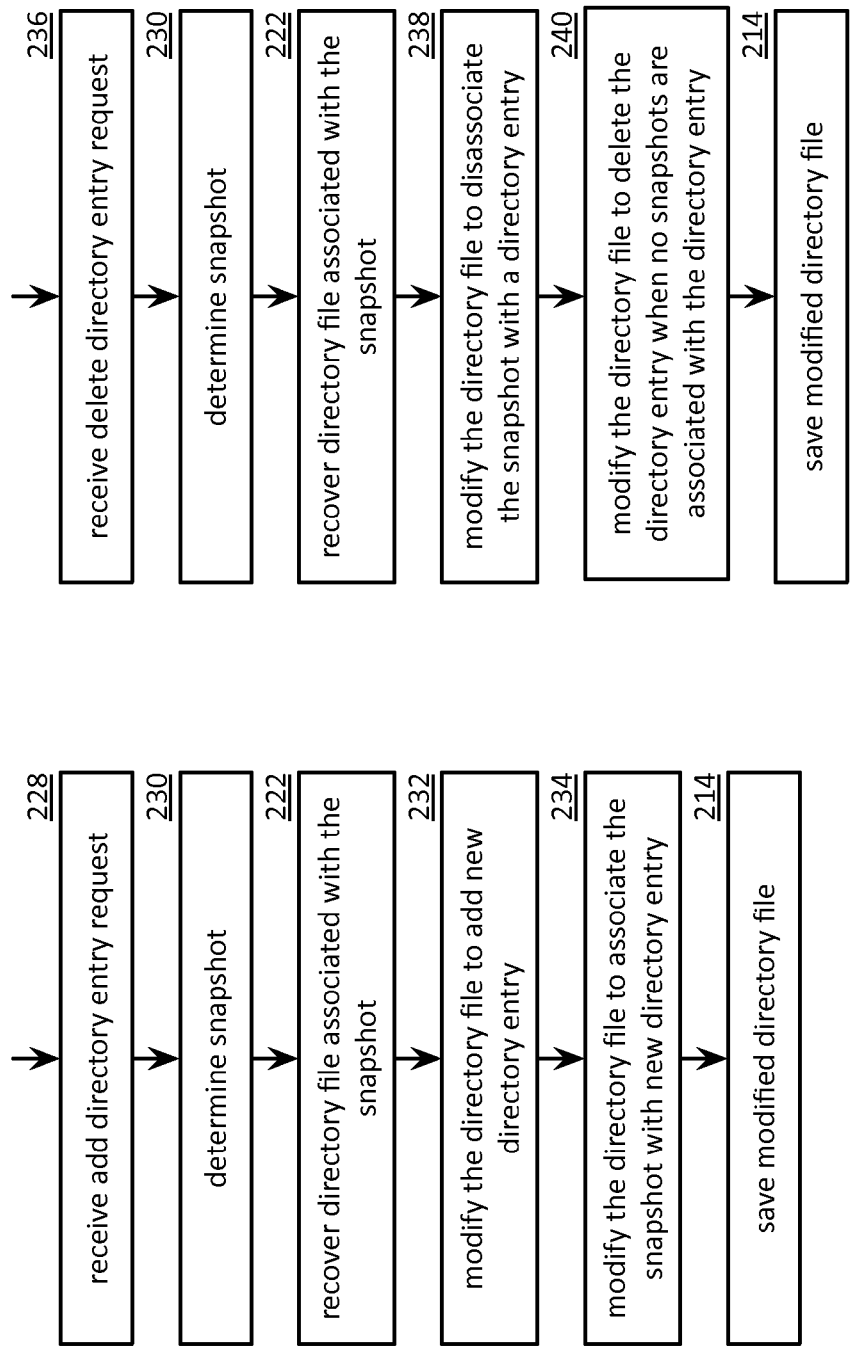

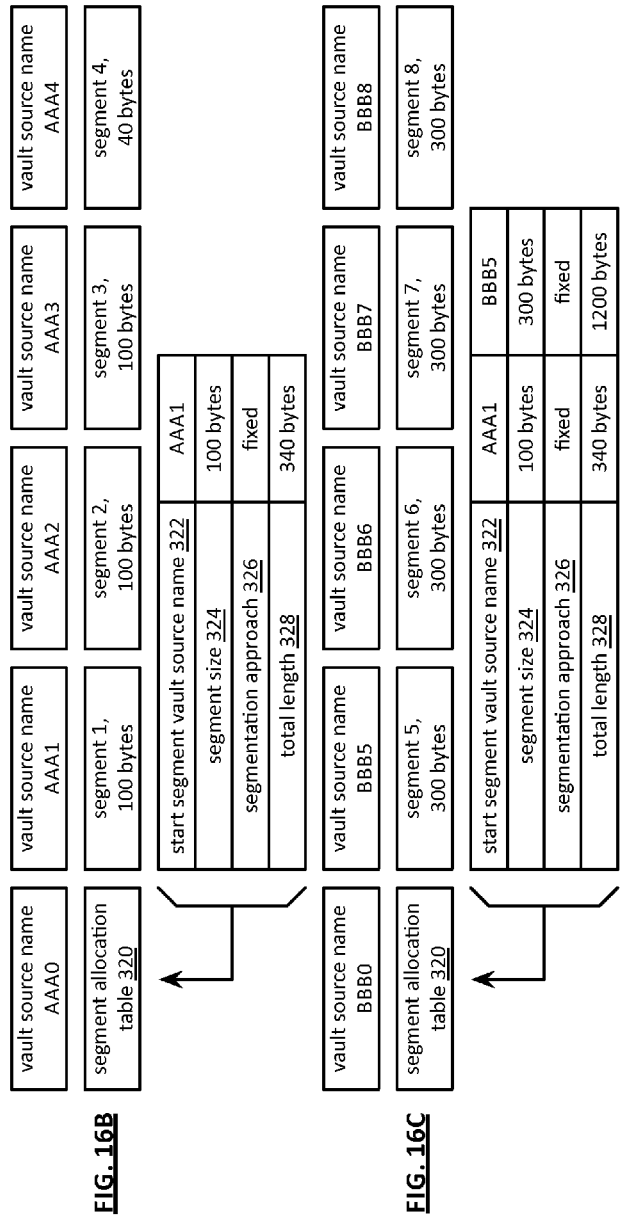

| | | directory file 400 | | | | |
|---|---|---|---|---|---|---|
| file name 402 | snapshot 404 | SAT vault source name 406 | mod timestamp 408 | size 410 | metadata 412 | content 414 |
| CS400.doc | root | 0 | - | - | - | - |
| CS400.doc | foo | BBB0 | t3 | 1540 | a30 | fd59a |
| CS400.doc | bar | BBB0 | t6 | 1540 | fb78 | 3957 |
| ... | | | | | | |

| slice name 440 | | | | |
|---|---|---|---|---|
| slice index 332 | vault source name 442 | | | |
| | source name 336 | | append marker 444 | segment number 338 |
| | vault ID 340 | gen 342 | object number 344 | | |
| region 1 SAT | AA | | | 0 | 0 |
| region 1 segment 1 data | AA | | | 0 | 1 |
| region 2 SAT | AA | | | 1 | 0 |
| region 2 segment 1 data | AA | | | 1 | 5 |

FIG. 20B

| vault source name AA00 |
|---|
| segment allocation table 446 |

↙ ↘

| vault source name AA01 | vault source name AA02 | vault source name AA03 | vault source name AA04 |
|---|---|---|---|
| segment 1, 100 bytes | segment 2, 100 bytes | segment 3, 100 bytes | segment 4, 40 bytes |

| start segment vault source name 322 | AA01 |
|---|---|
| segment size 324 | 100 bytes |
| segmentation approach 326 | fixed |
| total length 328 | 340 bytes |

FIG. 20C

| vault source name AA10 |
|---|
| segment allocation table 448 |

↙ ↘

| vault source name AA15 | vault source name AA16 | vault source name AA17 | vault source name AA18 |
|---|---|---|---|
| segment 5, 300 bytes | segment 6, 300 bytes | segment 7, 300 bytes | segment 8, 300 bytes |

| start segment vault source name 322 | AA01 | AA15 |
|---|---|---|
| segment size 324 | 100 bytes | 300 bytes |
| segmentation approach 326 | fixed | fixed |
| total length 328 | 340 bytes | 1200 bytes |

STORING DIRECTORY METADATA IN A DISPERSED STORAGE NETWORK

CROSS REFERENCE TO RELATED PATENTS

The present U.S. Utility Patent Application claims priority pursuant to 35 U.S.C. §119(e) to U.S. Provisional Patent Application Ser. No. 61/426,237, entitled "Dispersed Storage Network File System", having a provisional filing date of Dec. 22, 2010, which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

Another solution is to utilize dispersed storage wherein data is segmented to produce a plurality of data segments wherein each data segment of the plurality of data segments is dispersed storage error encoded to produce a set of encoded data slices of a plurality of sets of encoded data slices that are stored within a dispersed storage network memory. A plurality of sets of slice names are generated that correspond to the plurality of sets of encoded data slices, wherein each slice name provides a virtual dispersed storage network memory address to access and associated encoded data slice within the dispersed storage network memory. The number of data segments of the plurality of data segments depends on a segmentation scheme and the size of the data. A data size indicator may be appended to a first data segment of the plurality of data segments prior to the dispersed storage error encoding of the first data segment. Retrieving the data from the dispersed storage network requires a first operation to retrieve a set of encoded data slices associated with the first data segment to reproduce the first data segment and the appended data size indicator. A second operation may retrieve subsequent data segments of the plurality of data segments based on the data size indicator (e.g., enabling generating an appropriate number of sets of slice names corresponding to the subsequent data segments). Some data retrieval scenarios may require an access latency time associated with just one operation.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 6 is a flowchart illustrating an example of updating a directory in accordance with the invention;

FIG. 10A is a diagram illustrating an example of a snapshot file and a directory file relationship in accordance with the invention;

FIG. 10B is a diagram illustrating another example of a snapshot file and a directory file relationship in accordance with the invention;

FIG. 10C is a diagram illustrating another example of a snapshot file and a directory file relationship in accordance with the invention;

FIG. 10D is a diagram illustrating another example of a snapshot file and a directory file relationship in accordance with the invention;

FIG. 10E is a diagram illustrating another example of a snapshot file and a directory file relationship in accordance with the invention;

FIG. 10F is a diagram illustrating another example of a snapshot file and a directory file relationship in accordance with the invention;

FIG. 10G is a diagram illustrating another example of a snapshot file and a directory file relationship in accordance with the invention;

FIG. 10H is a diagram illustrating another example of a snapshot file and a directory file relationship in accordance with the invention;

FIG. 11A is a flowchart illustrating an example of adding a snapshot in accordance with the invention;

FIG. 11B is a flowchart illustrating an example of deleting a snapshot in accordance with the invention;

FIG. 12A is a flowchart illustrating another example of updating a directory in accordance with the invention;

FIG. 12B is a flowchart illustrating another example of updating a directory in accordance with the invention;

FIG. 16A is a diagram illustrating an example of a slice name format in accordance with the invention;

FIG. 16B is a diagram illustrating an example of data segmentation in accordance with the invention;

FIG. 16C is a diagram illustrating another example of data segmentation in accordance with the invention;

FIG. 18 is a diagram illustrating an example of a directory file format in accordance with the invention;

FIG. 20A is a diagram illustrating another example of a slice name format in accordance with the invention;

FIG. 20B is a diagram illustrating an example of data segmentation in accordance with the invention;

FIG. 20C is a diagram illustrating another example of data segmentation in accordance with the invention;

DETAILED DESCRIPTION OF THE INVENTION

Figure 1:
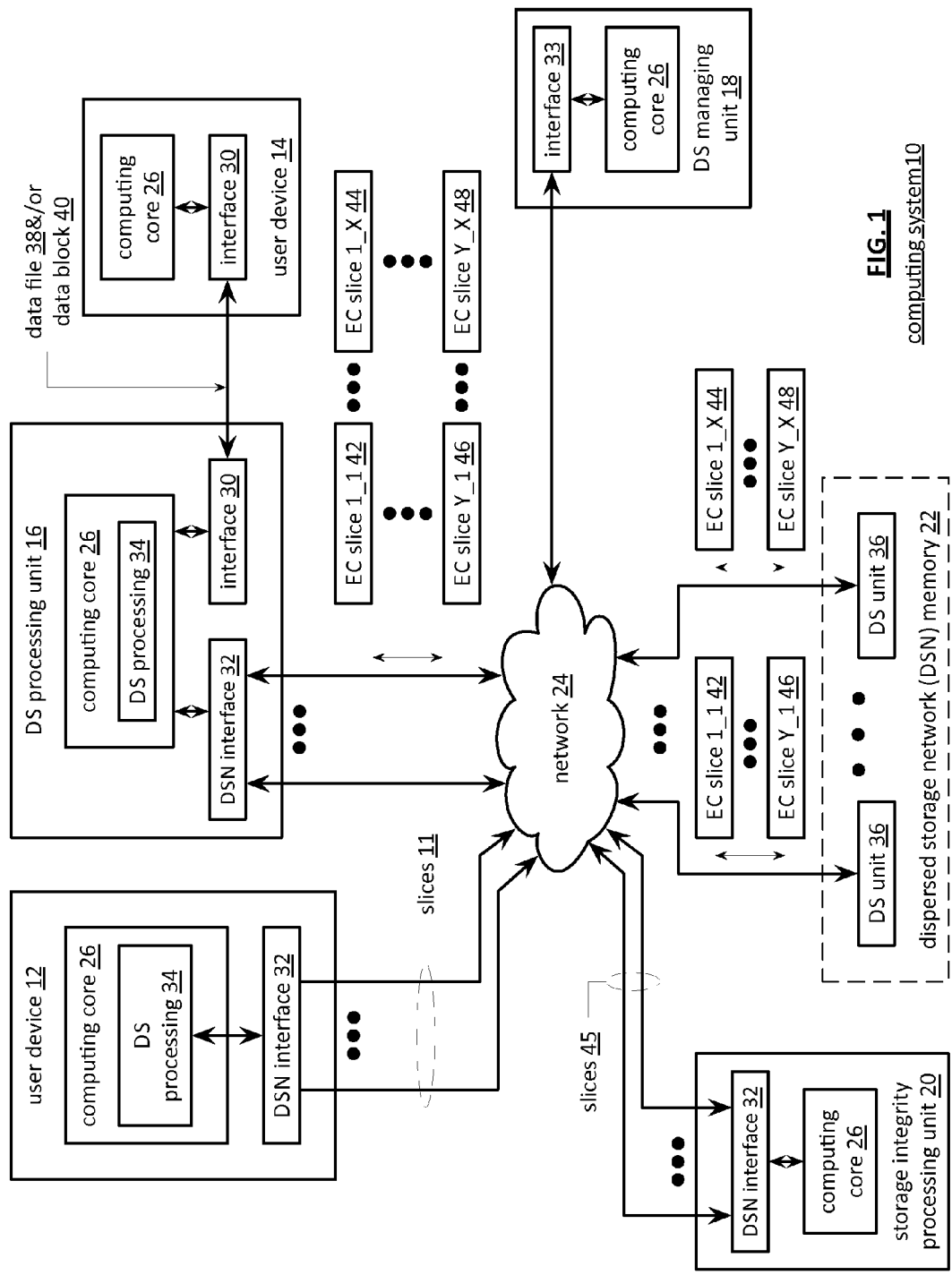
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
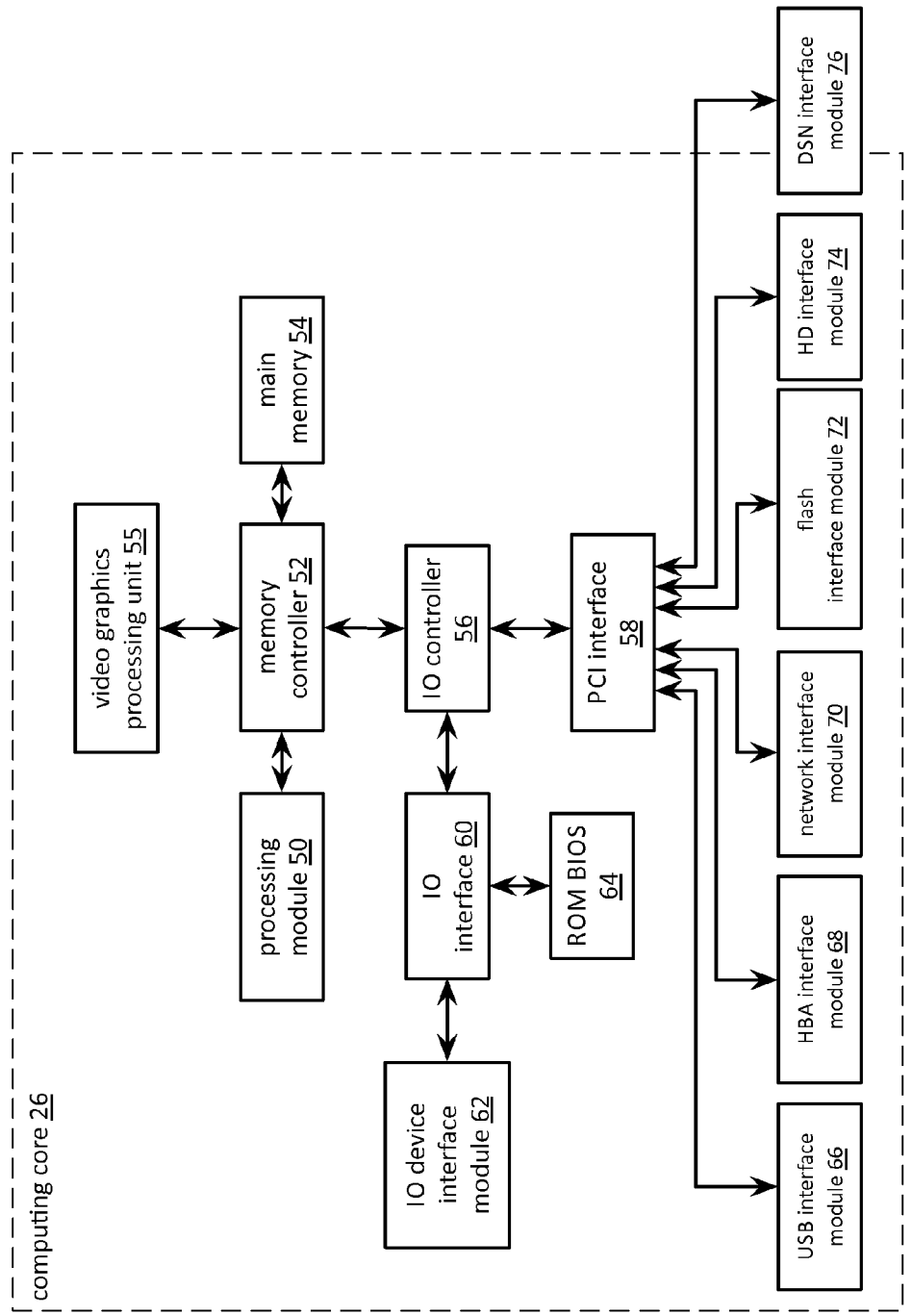
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
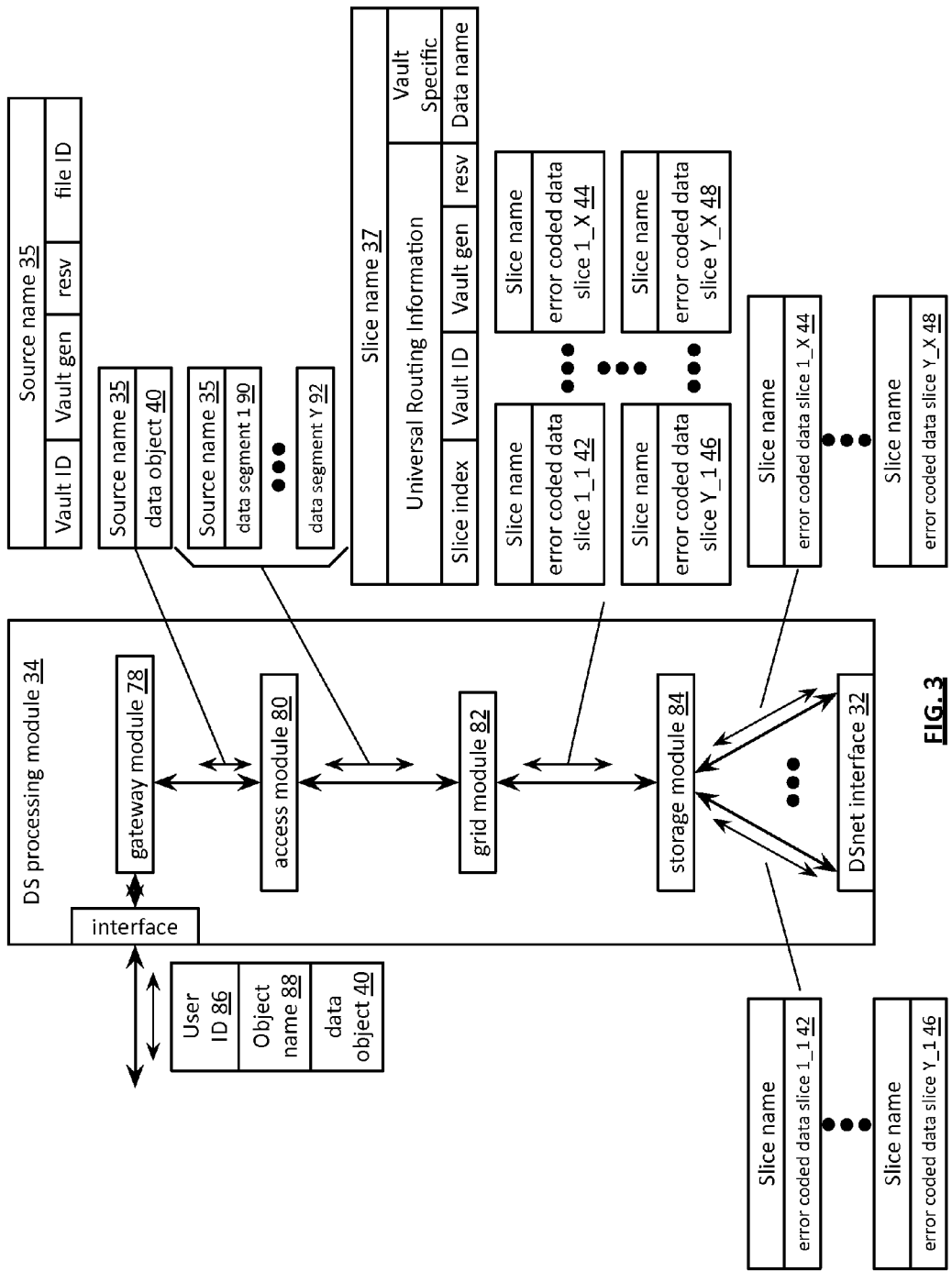
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

FIG. 6 is a flowchart illustrating an example of updating a directory. The method begins with step 102 where a processing module (e.g., of a dispersed storage (DS) processing unit) sends data for storage to a dispersed storage network (DSN) memory. For example, the processing module dispersed storage error encodes the data to produce a plurality of sets of encoded data slices and sends the plurality of sets of encoded data slices to a set of dispersed storage (DS) units of the DSN memory for storage therein. The method continues at step 104 where the processing module determines directory metadata updates of data store operation. The directory metadata includes one or more of a directory file (e.g., that indicates an association between a filename of the data and a DSN address), a snapshot file (e.g., that indicates a relationship between at least two snapshots, wherein a snapshot corresponds to content of a directory file when the snapshot was generated), and a segment allocation table (SAT) (e.g., which includes DSN address information with regards to the storage of the data). The determination may be based on one or more of a new filename associated with the data, a current snapshot pointer (e.g., indicating which snapshot to associate the data with), and a plurality of DSN addresses associated with the plurality of sets of encoded data slices (e.g., a vault source name associated each data segment of a plurality of data segments corresponding to each set of the plurality of sets of encoded and slices).

The method continues at step 106 where the processing module updates directory metadata based on the directory metadata updates. For example, the processing module retrieves previous directory metadata (e.g., from a local cache memory) and modifies the previous directory metadata in accordance with the directory metadata updates to produce the directory metadata. The method continues at step 108 where the processing module stores the directory metadata in a local cache memory.

The method continues at step 110 where the processing module determines whether to synchronize the directory metadata with directory information stored in the DSN memory. Such directory metadata stored in the local cache memory corresponds to directory information at a local level utilized by the processing module whereas the directory information stored in the DSN memory corresponds to directory information at a system wide level (e.g., utilized by additional processing modules). The determination may be based on one or more of detecting a time interval since a last update is greater than a time threshold, an indicator to always synchronize after a store operation, a data type indicator, a frequency of change indicator, a system activity indicator, a timestamp of previous synchronizations, message, and a command. For example, the processing module determines to synchronize when the time interval since the last update is 60 seconds and the time threshold is 50 seconds. The method branches to step 112 when the processing module determines to synchronize. The method repeats back to step 110 when the processing module determines not to synchronize.

The method continues at step 112 where the processing module dispersed storage error encodes a portion of the directory metadata to produce encoded directory slices. The processing module may select the portion based on a change indicator since the last update. The method continues at step 114 where the processing module sends checked write messages to DS units of the DSN memory than include at least some of the encoded directory slices, a transaction number corresponding to storing the encoded directory slices, and revision information. The revision information includes a revision number corresponding to the encoded directory slices being stored and an expected slice revision number corresponding to a last revision number of the encoded directory slices from a viewpoint of the processing module (e.g., aligned with the directory metadata stored in the cache memory). The transaction number associates two or more steps associated with the storing of data slices. The transaction number may be utilized to facilitate data revision integrity when two or more processing modules store similar data to a common set of DS units. The processing module may generate a new transaction number based on one or more of a current time indicator and a random number. The DS unit stores an encoded data slice of the checked write message and returns a favorable checked write response message (e.g., a checked write status indicator indicates no error) when the expected slice revision number is substantially the same as a stored slice revision number. The DS unit does not store the encoded data slice of the checked write message and returns an unfavorable checked write response message (e.g., the checked write status indicator indicates at least one error) when the expected slice revision number is not substantially the same as the stored slice revision number. Such an unfavorable checked write response message includes the checked write status indicator that includes an indication of one or more of slice locked by another transaction, slice not assigned to the DS unit, the expected slice revision number does not match the stored slice revision number, and a requester is not authorized to write the slice to the DS unit.

The method continues at step 116 where the processing module receives checked write response messages from the DSN memory. The method continues at step 118 where the processing module determines whether the checked write response messages are favorable based on checked write status indicators of the checked write response messages. The method branches to step 122 when the processing module determines that the checked write response messages are not favorable. The method continues to step 120 when the processing module determines that the checked write response messages are favorable. At step 120, the processing module sends commit transaction messages to the DSN memory that include the transaction number associated with storing the encoded directory slices. A DS unit changes a status of at least one encoded directory slice to be visible for subsequent retrieval when the DS unit receives the commit transaction message.

The method continues at step 122 where the processing module recovers the directory information from the DSN memory when the processing module determines that the checked write response messages are not favorable. For example, the processing module sends read requests to the DSN memory, receives encoded directory slices, and dispersed storage error decodes the encoded directory slices to produce the directory information. The method continues at step 124 where the processing module determines directory metadata updates based on the directory information. The directory metadata may not include newer updates to the directory information. The determination may be based on a received update flag, a message, the directory information, the directory metadata, and a comparison of the directory information to the directory metadata. The method repeats back to step 106 where the processing module updates the directory metadata based on the directory metadata updates.

Figure 7:
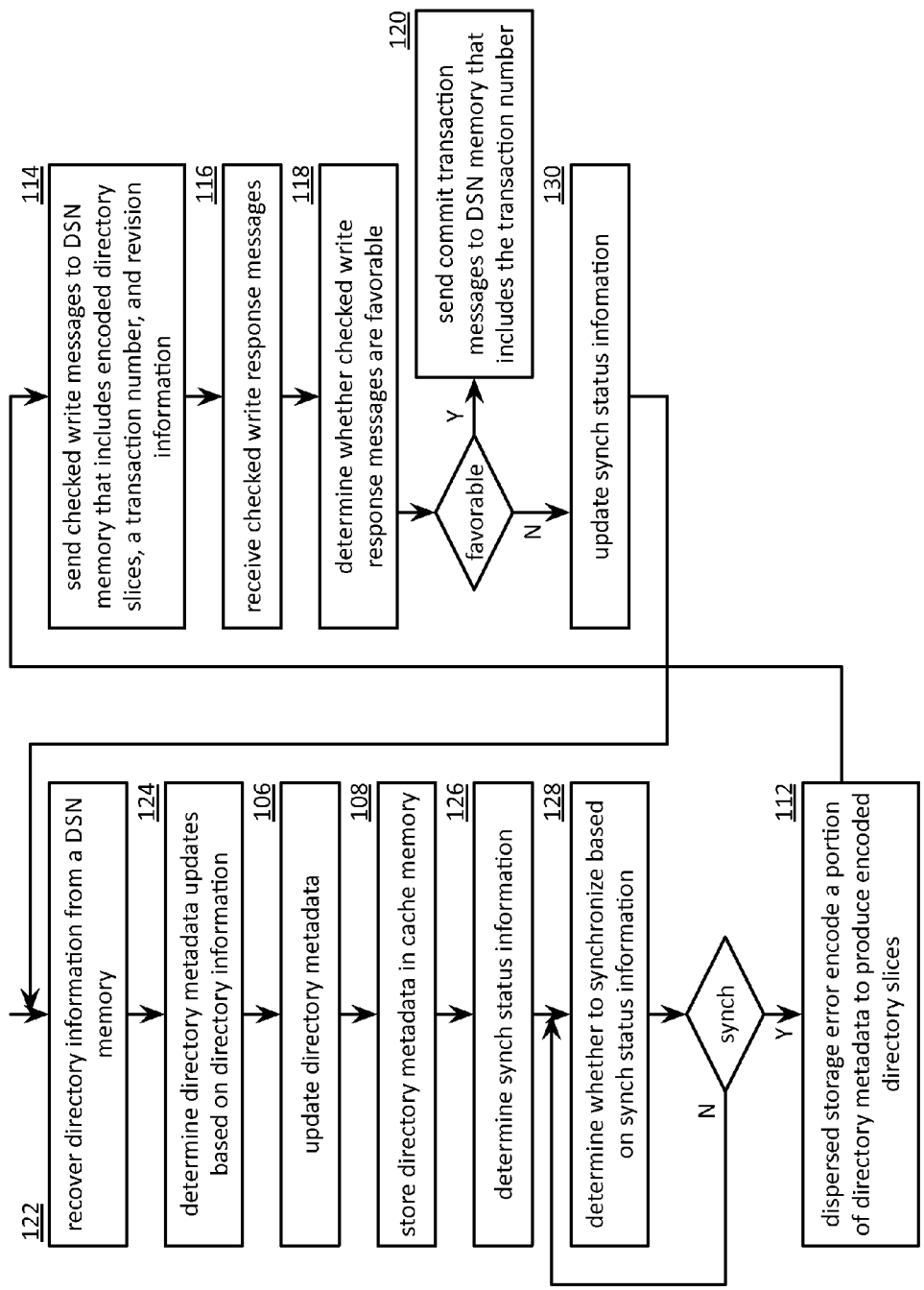
FIG. 7 is a flowchart illustrating another example of updating a directory in accordance with the invention.

FIG. 7 is a flowchart illustrating another example of updating a directory, which includes many similar steps to FIG. 6. The method begins with steps 122, 124, 106, and 108 of FIG. 6 where a processing module (e.g., of a dispersed storage (DS) processing unit) recover s directory information from a dispersed storage network (DSN) memory, determines directory metadata updates based on the directory information, updates directory metadata, and stores the directory metadata in a cache memory.

The method continues at step 126 where a processing module determines synchronization status information. The synchronization status information includes at least one of a timer, how many previous failed synchronization attempts have been made since the last successful synchronization, time since last unsuccessful attempt to synchronize, historical synchronization attempts access information, an update frequency indicator, a number of users that are authorized to access a common stored vault, and a service level agreement. The determination may be based on one or more of a query, a historical record lookup, a message, a table lookup, and a command.

The method continues at step 128 where the processing module determines whether to synchronize based on the synchronization status information. For example, the processing module determines to synchronize when an elapsed time since a last synchronization attempt is above a first time threshold when a number of consecutive on successful attempts is less than an attempt threshold (e.g., attempt more often to start). As another example, the processing module determines to synchronize when the elapsed time since the last authorization attempt is above a second time threshold when the number of consecutive unsuccessful attempts is greater than the attempt threshold (e.g., attempt less often later). The method branches to step 112 of FIG. 6 when the processing module determines to synchronize. The method repeats back to step 128 when the processing module determines not to synchronize.

The method continues with steps 114-120 of FIG. 6 where the processing module dispersed storage error encodes a portion of the directory metadata to produce encoded directory slices; sends checked write messages to the DSN memory that includes encoded directory slices, a transaction number, and revision information; receives checked write response messages; determines whether the checked write response messages are favorable; and sends commit transaction messages to the DSN memory that include the transaction number when the processing module determines that the checked write response messages are favorable. The method continues at step 130 where the processing module updates the synchronization status information when the processing module determines that the checked write response messages are not favorable. The updating may include one or more of time stamping of a current unsuccessful attempt to synchronize, incrementing a counter of previous unsuccessful consecutive attempts, logging historical error information, and indicating a revisions difference. The method repeats back to step 122 of FIG. 6 where the processing module recovers directory information from the DSN memory.

Figure 8:
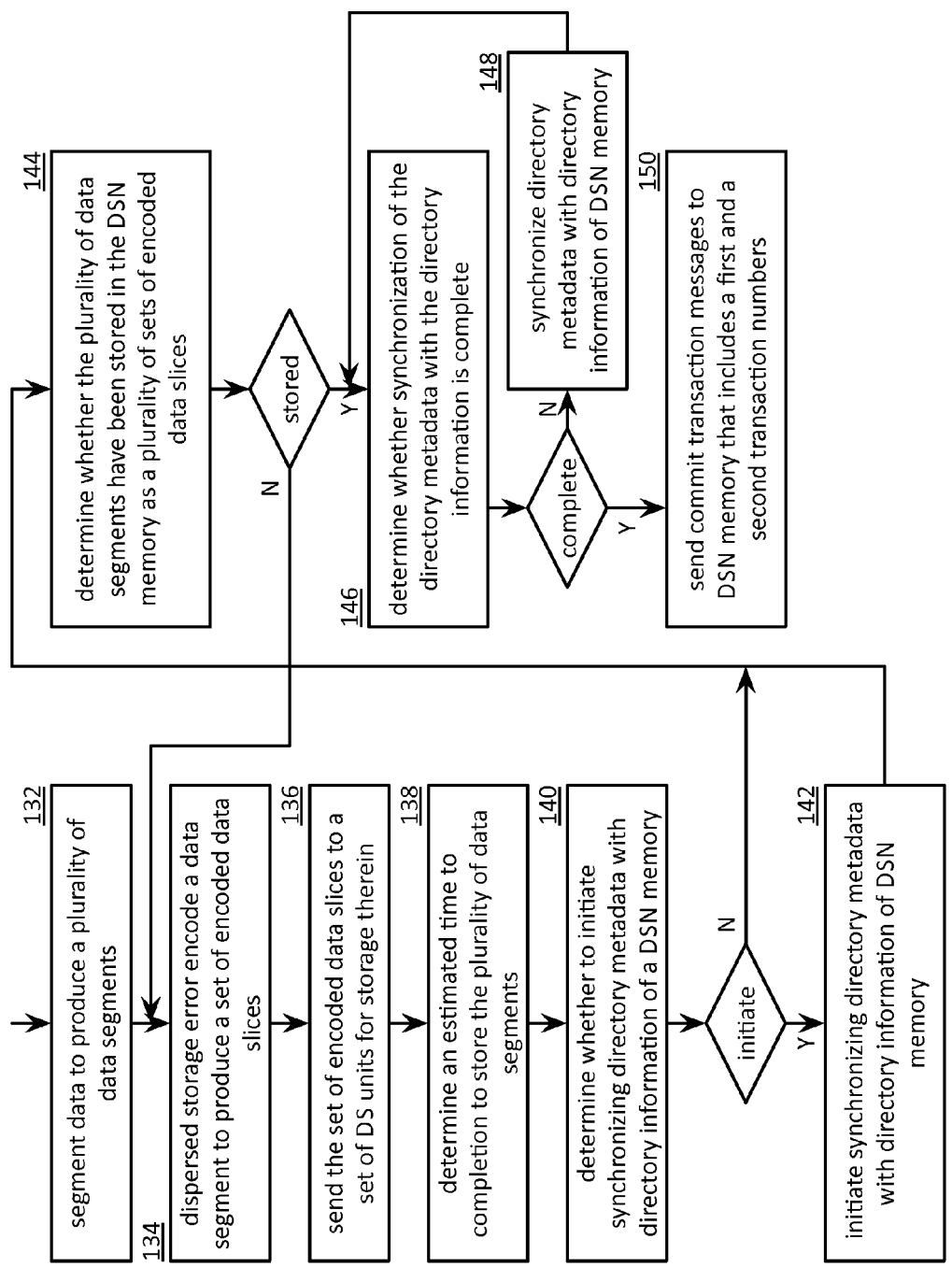
FIG. 8 is a flowchart illustrating an example of synchronizing directory information in accordance with the invention.

FIG. 8 is a flowchart illustrating an example of synchronizing directory information. The method begins with step 132 where a processing module (e.g., of a dispersed storage (DS) processing unit) segments data to produce a plurality of data segments in accordance with error coding dispersal storage function parameters. The method continues at step 134 where the processing module dispersed storage error encodes a data segment of the plurality of data segments to produce a set of encoded data slices utilizing an error coding dispersal storage function. The method continues at step 136 where the processing module sends the set of encoded data slices to a set of dispersed storage (DS) units for storage therein. For example, the processing module sends a set of write request messages to the set of DS units that includes the set of encoded data slices and a first transaction number associated with storing the set of encoded data slices.

The method continues at step 138 where the processing module determines an estimated time to completion to store the plurality of data segments. The determination may be based on one or more of a storage duration indicator associated with storing slices of a previous data segment, a number of data segments pending for storage, and an estimation algorithm. For example, the processing module determines the estimated time to completion to be 5 seconds when a first segment was stored in 1 second and there are 4 more segments to store.

The method continues at step 140 where the processing module determines whether to initiate synchronizing directory metadata with directory information of a dispersed storage network (DSN) memory. The determination may be based on one or more of the estimated time to completion, an estimated time duration to synchronize, a synchronization indicator, and a message. For example, the processing module determines to initiate synchronizing when the estimated time to completion is substantially the same as the estimated time to synchronize. The method branches to step 144 when the processing module determines not to initiate synchronizing the directory metadata with the directory information of the DSN memory. The method continues to step 142 when the processing module determines to initiate synchronizing the directory metadata with the directory information of the DSN memory.

The method continues at step 142 where the processing module initiates synchronizing the directory metadata with the directory information of the DSN memory. Such a step may be executed once. For example, the processing module initiates the synchronizing by modifying the directory metadata to add a directory entry corresponding to the data, encoding the directory metadata to produce one or more sets of encoded directory slices, and sending the one or more sets of encoded directory slices to the DSN memory for storage utilizing checked write messages that include encoded directory slices, a second transaction number associated with storing of the one or more sets of encoded directory slices, and revision information.

The method continues at step 144 where the processing module determines whether the plurality of data segments have been stored in the DSN memory as a plurality of sets of encoded data slices. For example, the processing module determines that the plurality of data segments have been stored in the DSN memory when the processing module receives at least a write threshold number of favorable write response messages corresponding to each set of encoded data slices acknowledging successful storage of the plurality of sets of encoded data slices. The method repeats back to step 134 when the processing module determines that the plurality of data segments have not been stored in the DSN memory. The method continues to step 146 when the processing module determines that the plurality of data segments have been stored in the DSN memory.

The method continues at step 146 where the processing module determines whether synchronization of the directory metadata with the directory information is complete. For example, the processing module determines that the synchronization is complete when the processing module receives at least a write threshold number of favorable write response messages corresponding to each set of encoded directory slices of the one or more sets of encoded directory slices acknowledging successful storage of the one or more sets of encoded directory slices. The method branches to step 150 when the processing module determines that the synchronization is complete. The method continues to step 148 when the processing module determines that the synchronization is not complete.

The method continues at step 148 where the processing module synchronizes the directory metadata with the directory information of the DSN memory. The processing module may continue the process (e.g., writing encoded directory slices) when the processing module had previously initiated synchronizing the directory metadata with the directory information. The processing module initiates the synchronizing of the directory metadata with the directory information when the processing module had not previously initialized the synchronizing (e.g., when the data segments have been stored but the synchronization had not been started). The method repeats back to step 146 where the processing module determines whether the synchronization of the directory metadata with the directory information is complete. The method continues at step 150 where the processing module sends commit transaction messages to the DSN memory that includes the first transaction number and the second transaction number to complete synchronization of the data storage and the associated directory information when the processing module determines that the synchronization of the directory metadata with the directory information is complete.

Figure 9:
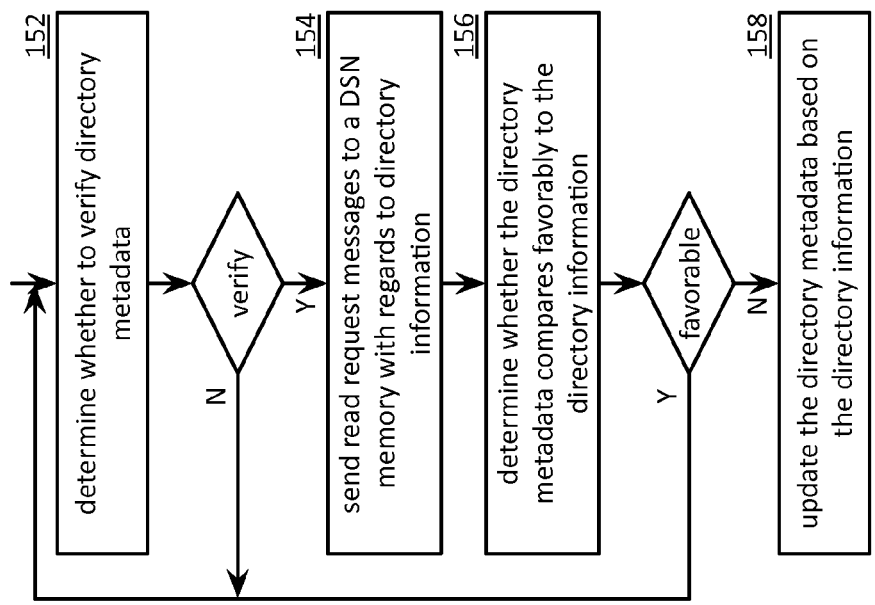
FIG. 9 is a flowchart illustrating another example of synchronizing directory information in accordance with the invention.

FIG. 9 is a flowchart illustrating another example of synchronizing directory information. The method begins with step 152 where a processing module (e.g., of a dispersed storage (DS) processing unit) determines whether to verify directory metadata. The determination may be based on one or more of a timer associated with a metadata entry, a time threshold, a directory access frequency indicator, and access frequency threshold, a conflicts frequency indicator, a conflicts threshold, an average system loading indicator, a system loading threshold, an overall timer, and a overall time threshold. For example, the processing module determines to verify the directory metadata when a timer associated with the metadata entry file name stuff.txt is greater than a time threshold. The method repeats back to step 152 when the processing module determines to not verify the directory metadata. The method continues to step 154 when the processing module determines to verify the directory metadata.

The method continues at step 154 where the processing module sends read request messages to a dispersed storage network (DSN) memory with regards to directory information. For example, the processing module sends read request messages to dispersed storage (DS) units of the DSN memory to retrieve the directory information such that a DS unit sends the processing module an encoded data slice corresponding to a read request message in response. As another example, the processing module sends checked read request messages to DS units of the DSN memory, wherein the checked read request messages includes an expected revision number to retrieve the directory information such that a DS unit sends the processing module an encoded data slice corresponding to a checked read request message in response when the encoded data slice corresponds to a stored slice revision number different than the revision number. As such, network resources may not be utilized between the DS unit and the processing module to send an encoded data slice when the stored encoded data slice is substantially the same as what is expected (e.g., stored as directory metadata in a local cache memory associated with the processing module).

The method continues at step 156 where the processing module determines whether the directory metadata compares favorably to the directory information. The determination may be based on one or more of comparing received directory information (e.g., received directory information produced from decoded received directory slices) to the directory metadata and a checked read response message that indicates a revision associated with the directory information is substantially the same as a revision associated with the directory metadata. For example, the processing module determines that the directory metadata compares favorably to the directory information when the received directory information from the DSN memory is substantially the same as the directory metadata. As another example, the processing module determines that the directory metadata compares favorably to the directory information when the checked read response message indicates that revision 430 is associated with the directory information and revision 430 is also associated with the directory metadata.

The method repeats back step 152 when the processing module determines that the directory metadata compares favorably to the directory information. The method continues to step 158 when the processing module determines that the directory metadata does not compare favorably to the directory information. The method continues at step 158 where the processing module updates the directory metadata based on the directory information. For example, the processing module selects new entries of the directory information that do not match items of the directory metadata to update the directory metadata.

FIG. 10A is a diagram illustrating an example of a snapshot file 160 and of a directory file 162 relationship. Such a snapshot file 160 includes a current snapshot field, 164, a children field 166, and a timestamp field 168. The directory file 162 includes one or more directory file entries, wherein a directory file entry includes a file identifier (ID) and an association with one or more snapshot IDs. For example, one or more file IDs are listed for each associated snapshot ID. As another example, one or more snapshot IDs are listed for each associated file ID.

The parent snapshot field 164 includes a parent snapshot ID associated with a parent snapshot where the parent snapshot may include a parent relationship with one or more other children snapshots. The children field 166 includes one or more children snapshot IDs associated with children snapshots where the children snapshots include a child relationship with a parent snapshot. The timestamp field 168 includes a timestamp corresponding to when the parent snapshot of the snapshot file entry was created. FIGS. 10A-10H illustrate examples of an associated snapshot file and at least one corresponding directory file as example events occur at various successive times. Such events may include adding a snapshot, deleting a snapshot, adding a directory entry, and deleting a directory entry. The method of operation to modify the snapshot file and the at least one directory file is further discussed with reference to FIGS. 11A, 11B, 12A, and 12B.

Note that FIG. 10A represents the snapshot file 160 and the directory file 162 subsequent to a starting point at time=0 (e.g., timestamp t=0) where a parent snapshot ID=root is added at t=0, wherein the parent snapshot root has no children and the associated directory file indicates that files ip.txt and CS289.doc are associated with the snapshot root. Allowed access to snapshot root implies that access to the files ip.txt and CS289.doc are enabled.

FIG. 10B is a diagram illustrating another example of a snapshot file 160 and a directory file 170 relationship at t=1 where a file with a file ID of CS281.doc is added to the directory file for snapshot root. Allowed access to snapshot root implies that access to files ip.txt, CS289.doc, and CS281.doc is enabled.

FIG. 10C is a diagram illustrating another example of a snapshot file 172 and a directory file 170, 174 relationship subsequent to t=2 where a snapshot ID=foo is added at t=2, wherein snapshot foo is both a parent snapshot with no children and a child snapshot of the parent snapshot root. Each file associated with the parent snapshot root at the time of creating the snapshot foo is now associated with the snapshot foo. Allowed access to snapshot root still implies that access to files ip.txt, CS289.doc, and CS281.doc is enabled and that allowed access to snapshot foo implies that access to files ip.txt, CS289.doc, and CS281.doc is enabled. Further note that while FIG. 10C illustrates directory files 170 and 174 associating file names by snapshot, a single directory file may be utilized that associates snapshots with each filename. As a specific example, file ip.txt is associated with the snapshot root and the snapshot foo.

FIG. 10D is a diagram illustrating another example of a snapshot file 172 and a directory file 170 and 182 relationship at t=3 where a file with a file ID of CS400.doc is added to the directory file 182 for snapshot foo. Allowed access to snapshot root still implies that access to files ip.txt, CS289.doc, and CS281.doc is enabled and that allowed access to snapshot foo implies that access to files ip.txt, CS289.doc, CS281.doc, and CS400.doc is enabled. Access to snapshot root does not imply that access to file CS400.doc is enabled (e.g., a parent snapshot does not inherit access to files associated with an associated child snapshot).

FIG. 10E is a diagram illustrating another example of a snapshot file 172 and a directory file 184 and 182 relationship at t=4 where file ip.txt is deleted from the directory file 182 for snapshot root. Allowed access to snapshot root still implies that access to files CS289.doc and CS281.doc is enabled (but not ip.txt) and that allowed access to snapshot foo still implies that access to files ip.txt, CS289.doc, CS281.doc, and CS400.doc is enabled. A child snapshot retains access to files that are unassociated from an associated parent snapshot.

FIG. 10F is a diagram illustrating another example of a snapshot file 172 and a directory file 186 and 182 relationship at t=5 where a file with a file ID of blah.txt is added to the directory file 186 for snapshot root. Allowed access to snapshot root implies that access to files CS289.doc, CS281.doc, and blah.txt is enabled and that allowed access to snapshot foo implies that access to files ip.txt, CS289.doc, CS281.doc, and CS400.doc is enabled (but not blah.txt). Access to a file associated with a parent by a child after the child was created is not allowed, e.g., access to snapshot foo does not imply that access to file blah.txt is enabled since file blah.txt was added to snapshot root after the child snapshot foo was created.

FIG. 10G is a diagram illustrating another example of a snapshot file 188 and a directory file 186, 182, and 190 relationship subsequent to t=6 where a snapshot ID=bar is added at t=6, wherein snapshot bar is both a parent snapshot with no children and a child snapshot of parent snapshot foo. Each file associated with the parent snapshot and upwards (e.g., all parents of the parent) at the time of creating the snapshot bar is now associated with the snapshot bar. Allowed access to snapshot root still implies that access to files CS289.doc, CS281.doc, and blah.txt is enabled; allowed access to snapshot foo still implies that access to files ip.txt, CS289.doc, CS281.doc, and CS400.doc is enabled; and allowed access to snapshot bar implies that access to files ip.txt, CS289.doc, CS281.doc, CS400.doc, and blah.txt is enabled.

FIG. 10H is a diagram illustrating another example of a snapshot file 188 and a directory file 186, 182 and 198 relationship at t=7 where a file with a file ID of CS500.doc is added to the directory file 198 for snapshot bar. Allowed access to snapshot root still implies that access to files CS289.doc, CS281.doc, and blah.txt is enabled; allowed access to snapshot foo still implies that access to files ip.txt, CS289.doc, CS281.doc, and CS400.doc is enabled; and allowed access to snapshot bar implies that access to files ip.txt, CS289.doc, CS281.doc, CS400.doc, blah.txt, and CS500.doc is enabled. No upward parent snapshots inherit access to files associated with an associated child snapshot as files are added to the child snapshot. For example, access to the file CS500.doc is not enabled for snapshot root and snapshot foo.

FIG. 11A is a flowchart illustrating an example of adding a snapshot. The method begins with step 200 where a processing module (e.g., of a dispersed storage (DS) processing unit) receives an add snapshot request. The add snapshot request includes one or more of a parent snapshot identifier (ID), a timestamp, a read-only indicator, an active snapshot indicator, a vault ID, and a snapshot ID. The processing module may authorize the request by comparing a received requester ID with an authorized ID and authorizing the request when the received requester ID and be authorized ID are substantially the same. The method continues when the processing module authorizes the request.

The method continues at step 202 where the processing module determines a parent snapshot when the request is authorized. The determination may be based on one or more of receiving the parent snapshot ID, receiving the active snapshot indicator, a vault ID, a list, a message, and a query. The method continues at step 204 where the processing module recovers a snapshot file. The recovering includes determining a snapshot file dispersed storage network (DSN) address based on the vault ID, sending read requests messages with regards to encoded snapshot file slices to a DSN memory, receiving read response messages that include encoded snapshot file slices, and dispersed storage error decoding the encoded snapshot file slices to produce the snapshot file.

The method continues at step 206 where the processing module modifies the snapshot file to include a new snapshot. The modification to the snapshot file includes one or more of adding the snapshot ID (e.g., from the request) as a child snapshot to the determined parent snapshot, creating a timestamp from a real-time indicator, adding the child snapshot ID as a parent snapshot ID with no children, and indicating whether the snapshot is read-only based on the read-only indicator of the requests. The method continues at step 208 where the processing module saves the modified snapshot file. The saving includes dispersed storage error encoding the modified snapshot file to produce encoded modified snapshot file slices and sending the modified snapshot file slices to the DSN memory for storage therein.

The method continues at step 210 where the processing module recovers directory file information based on snapshot file information of the snapshot file. The recovering includes determining one or more directory file DSN addresses based on the snapshot ID in the vault ID, sending read requests messages with regards to encoded directory slices to the DSN memory utilizing the one or more directory file DSN addresses, receiving read response messages that include encoded directory slices, and dispersed storage error decoding the encoded directory slices to produce the directory file information. Note that the processing module recovers each directory file entry (e.g., each file name) associated with all parent snapshots of the new snapshot.

The method continues at step 212 where the processing module modifies the directory file information to associate the new snapshot with the directory file information (e.g., all filenames associated with parent snapshots of the new snapshot). The new snapshot enables access to all files associated with all parents of the new snapshot. The method continues at step 214 where the processing module saves the modified directory file information. The processing module may add a new directory file associated with the new snapshot and/or modify an existing directory file in accordance with the modified directory file information. Saving the modified directory file information includes dispersed storage error encoding the modified directory file information to produce encoded modified directory file slices and sending the encoded modified directory file slices to the DSN memory for storage therein.

FIG. 11B is a flowchart illustrating an example of deleting a snapshot, which includes many similar steps to FIG. 11A. The method begins with step 216 where a processing module (e.g., of a dispersed storage (DS) processing unit) receives a delete snapshot request. The delete snapshot request includes one or more of a parent snapshot identifier (ID), a timestamp, a read-only indicator, an active snapshot indicator, a vault ID, and a snapshot ID. The method continues with step 204 of FIG. 11A where the processing module recovers the snapshot file. The method continues at step 218 where the processing module modifies the snapshot file to link any children of the snapshot to a parent of the snapshot. As such, a grandparent snapshot becomes the parent snapshot of each of the children of the deleted snapshot. The method continues at step 220 where the processing module modifies the snapshot file to exclude (e.g., delete) the snapshot. The method continues with step 208 of FIG. 11A to save the modified snapshot file.

The method continues at step 222 where the processing module recovers a directory file associated with the snapshot corresponding to a vault associated with the snapshot to be deleted. The method continues at step 224 where the processing module modifies the directory file to disassociate the snapshot with directory file information. For example, the processing module modifies the directory file information such that associated directory file entries are no longer linked to the snapshot being deleted. The processing module may perform this task as a background activity. The method continues at step 226 where the processing module modifies the directory file to delete any directory entries no longer associated with any snapshots (e.g., completely remove the directory entries when there are no snapshots associated with the directory entries). The processing module may perform this task as a background activity. The method continues with step 214 of FIG. 11A where the processing module saves the modified directory file.

FIG. 12A is a flowchart illustrating another example of updating a directory, which includes similar steps to FIGS. 11A-B. The method begins with step 228 where a processing module (e.g., of a dispersed storage (DS) processing unit) receives an add directory entry request. The directory request includes one more of a snapshot identifier (ID), a timestamp, a directory ID, a directory entry, a file ID, a source name, and active snapshot indicator, and a vault ID. The method continues at step 230 where the processing module determines a snapshot. The determination may be based on one or more of receiving a snapshot ID, receiving an active snapshot indicator, a vault ID, a list, a message, and a query. For example, the processing module determines the snapshot based on receiving the snapshot ID in the add directory entry request.

The method continues with step 222 of FIG. 11B where the processing module recovers a directory file associated with the snapshot. The method continues at step 232 where the processing module modifies the directory file to add a new directory file entry. For example, the processing module adds a new filename and/or a source name to the directory information of the directory file. The method continues at step 234 where the processing module modifies the directory file to associate the snapshot with the new directory entry. For example, the processing module links the new filename to the snapshot ID but not to other snapshots. The method continues with step 214 of FIG. 11A where the processing module saves the modified directory file.

FIG. 12B is a flowchart illustrating another example of updating a directory, which includes similar steps to FIGS. 11A, 11B, and 12A. The method begins with step 236 where a processing module (e.g., of a dispersed storage (DS) processing unit) receives a delete directory entry request. The delete directory request includes one more of a snapshot identifier (ID), a timestamp, a directory ID, a directory entry, a file ID, a source name, and active snapshot indicator, and a vault ID. The method continues with step 230 of FIG. 12A where the processing module determines a snapshot. The method continues with step 222 of FIG. 11B where the processing module recovers a directory file associated with the snapshot. The method continues at step 238 where the processing module modifies the directory file to disassociate the snapshot with a directory entry. For example, the processing module modifies the directory file to no longer link the snapshot to the directory entry. The directory entry may still be linked to other snapshots. The method continues at step 240 where the processing module modifies the directory file to delete the directory entry when no snapshots are associated with the directory entry. The method continues with step 214 of FIG. 11A where the processing module saves the modified directory file.

Figure 13:
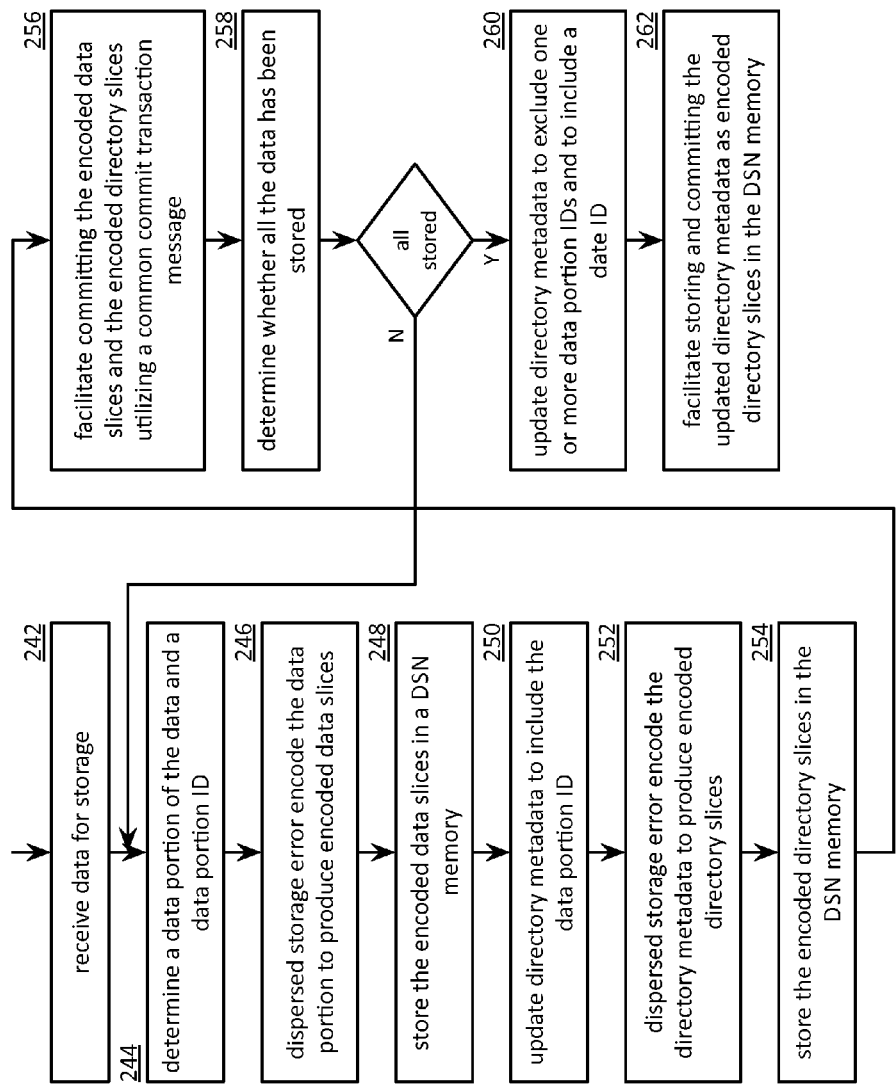
FIG. 13 is a flowchart illustrating an example of storing data in accordance with the invention.

FIG. 13 is a flowchart illustrating an example of storing data. The method begins with step 242 where a processing module (e.g., of a dispersed storage (DS) processing unit) receives data for storage. The receiving may include receiving one or more of the data, a data identifier (ID), a data type indicator, a file size indicator, and a storage requirement. The method continues at step 244 where the processing module determines a data portion of the data and a data portion ID. The determination may be based on one or more of the file size indicator, an upload speed indicator, the system performance indicator, an estimated duration of an upload, a duration threshold, the data type indicator, and the storage requirement. For example, the processing module determines the data portion to include 500 MB when the file size indicator indicates 5 GB, the estimated duration of the upload is 30 seconds, and the duration threshold is 2 seconds.

The method continues at step 246 where the processing module dispersed storage error encodes the data portion to produce encoded data slices. Alternatively, the processing module produces multiple sets of encoded data slices. The method continues at step 248 where the processing module stores the encoded data slices in a dispersed storage network (DSN) memory. For example, the processing module sends write request messages that includes the encoded data slices to the DSN memory and receives at least a write threshold number of favorable write response messages for each set of encoded data slices from the DSN memory.

The method continues at step 250 where the processing module updates directory metadata to include the data portion ID. The processing module may append a file extension to a filename or file ID associated with the data to indicate that the data portion is a portion and not all of the data. For example, the processing module appends a in-progress extension to the file name and stores the directory metadata in a cache memory. The method continues at step 252 where the processing module dispersed storage error encodes the directory metadata to produce encoded directory slices. Alternatively, the processing module produces multiple sets of encoded directory slices. The method continues at step 254 where the processing module stores the encoded directory slices in the DSN memory. For example, processing module sends write request messages that includes the encoded directory slices to the DSN memory and receives at least a write threshold number of favorable write response messages for each set of encoded directory slices from the DSN memory.

The method continues at step 256 where the processing module facilitates committing the encoded data slices and encoded directory slices utilizing a common commit transaction message. The common commit transaction message includes a first transaction number associated with the encoded data slices and a second transaction number associated with the encoded directory slices. The processing module sends the common commit transaction message to the DSN memory.

The method continues at step 258 where the processing module determines whether all the data has been stored based on comparing data portions stored to all of the data. The processing module determines that all the data has been stored when all the portions stored so far are substantially the same as all the data. The method repeats back to step 244 when the processing module determines that all the data has not been stored. The method continues to step 260 when the processing module determines that all the data has been stored.

The method continues at step 260 where the processing module updates the directory metadata to exclude one or more data portion ID sent to include a data ID. For example, the processing module eliminates the temporary file extension associated with the ID of the data. The method continues at step 262 where the processing module facilitates storing and committing the updated directory metadata as encoded directory slices in the DSN memory. For example, the processing module encodes the updated directory metadata to produce encoded directory slices, sends a write request message to the DSN memory that includes the encoded directory slices, and sends a commit transaction request message to the DSN memory.

Figure 14A:
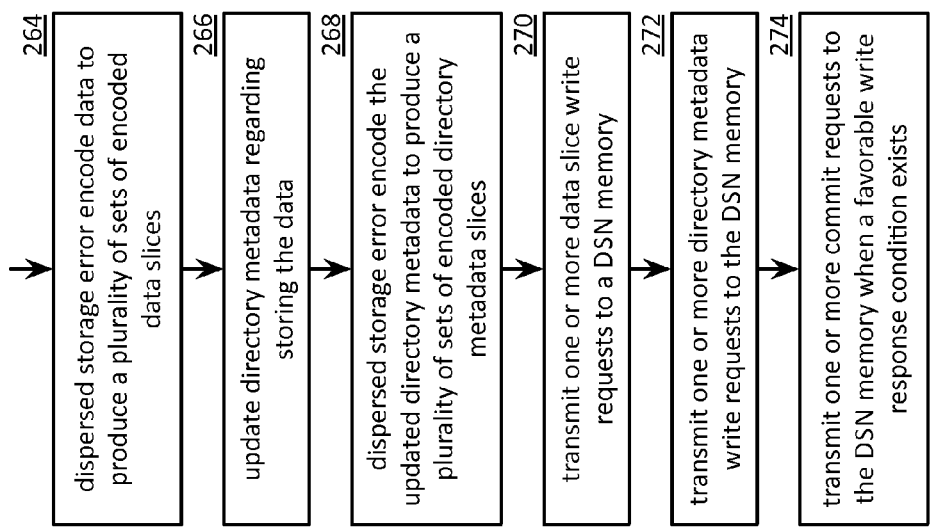
FIG. 14A is a flowchart illustrating another example of storing data in accordance with the invention.

FIG. 14A is a flowchart illustrating another example of storing data. The method begins with step 264 where a processing module (e.g., of a dispersed storage (DS) processing unit) dispersed storage error encodes data to produce a plurality of sets of encoded data slices. The method continues at step 266 where the processing module updates directory metadata regarding storing the data as the plurality of sets of encoded data slices in a dispersed storage network (DSN) memory to produce updated directory metadata. The updating the directory metadata includes retrieving the directory metadata from at least one of the DSN memory and a local memory (e.g., a cache memory), determining a DSN memory storage location information for the plurality of sets of encoded data slices, and modifying the directory metadata to include a filename associated with the data and the DSN memory storage location to produce the updated directory metadata. The DSN memory storage location information includes one or more of: a source name corresponding to a DSN memory storage location, a data size indicator, a data type indicator, snapshot information (e.g., a snapshot file, a snapshot pointer), a timestamp, and a segment allocation table (e.g., that includes a start segment vault source name, a segment size, a segmentation approach, and a total length for each region).

The method continues at step 268 where the processing module dispersed storage error encodes the updated directory metadata to produce a plurality of sets of encoded directory metadata slices. The method continues at step 270 where the processing module transmits one or more data slice write requests to the DSN memory regarding storing the plurality of sets of encoded data slices, wherein the one or more data slice write requests includes a first transaction number.

The transmitting the one or more data slice write requests includes generating a set of data slice write requests, wherein each of the data slice write requests includes the first transaction number regarding storage of a respective group of encoded data slices of the plurality of sets of encoded data slices and transmitting the set of data slice write requests to a set of dispersed storage (DS) units of the DSN memory. The group of encoded data slices may include one or more of a set of encoded data slices, a portion of a set of encoded data slices, encoded data slices associated with a common pillar, and encoded data slices associated with at least two common pillars. Alternatively, or in addition to, the transmitting the one or more data slice write requests includes generating a data slice write request, wherein the data slice write request includes the first transaction number regarding storage of the plurality of sets of encoded data slices and transmitting the set of data slice write requests to a set of dispersed storage (DS) units of the DSN memory, wherein a DS unit of the set of DS units is targeted to store a respective group of encoded data slices of the plurality of sets of encoded data slices.

The method continues at step 272 where the processing module transmits one or more directory metadata write requests to the DSN memory regarding storing the plurality of sets of encoded directory metadata slices, wherein the one or more directory metadata write requests includes a second transaction number. The method continues at step 274 where the processing module transmits one or more commit requests to the DSN memory, when a favorable write response condition exists, for at least one of: the one or more data slice write requests and the one or more directory metadata write requests, to commit storage of at least one of: the plurality of sets of encoded data slices and the plurality of sets of encoded directory metadata slices, wherein the commit request includes the first transaction number and the second transaction number.

For example, the processing module receives at least a threshold number of data slices write responses regarding the one or more data slice write requests and generates a commit request as the one or more commit requests. As another example, the processing module receives at least a threshold number of directory metadata write responses regarding the one or more directory metadata write requests and generates the commit request. As yet another example, the processing module receives at least a first threshold number of data slices write responses regarding writing a first set of encoded data slices of the plurality of sets of encoded data slices and generates a first commit request as one of the one or more commit requests. As a still further example, the processing module receives at least a first threshold number of directory metadata write responses regarding writing a first set of encoded directory metadata slices of the plurality of sets of encoded directory metadata slices and generates the first commit request. As yet an even further example, the processing module receives at least a second threshold number of data slices write responses regarding writing a second set of encoded data slices of the plurality of sets of encoded data slices and generates a second commit request as a second one of the one or more commit requests.

The transmitting one or more commit requests includes one of generating a common commit request as the one or more commit requests to include a common first transaction number and a common second transaction number regarding committing storage of the plurality of sets of encoded data slices and the plurality of sets of encoded directory metadata slices and generating a group of commit requests as the one or more commit requests, wherein a commit request of the group of commit requests includes a unique first transaction number and a unique second transaction number regarding committing storage of a respective group of encoded data slices of the plurality of sets of encoded data slices. Such storing of the data and the updated directory metadata may provide a synchronization system improvement.

Figure 14B:
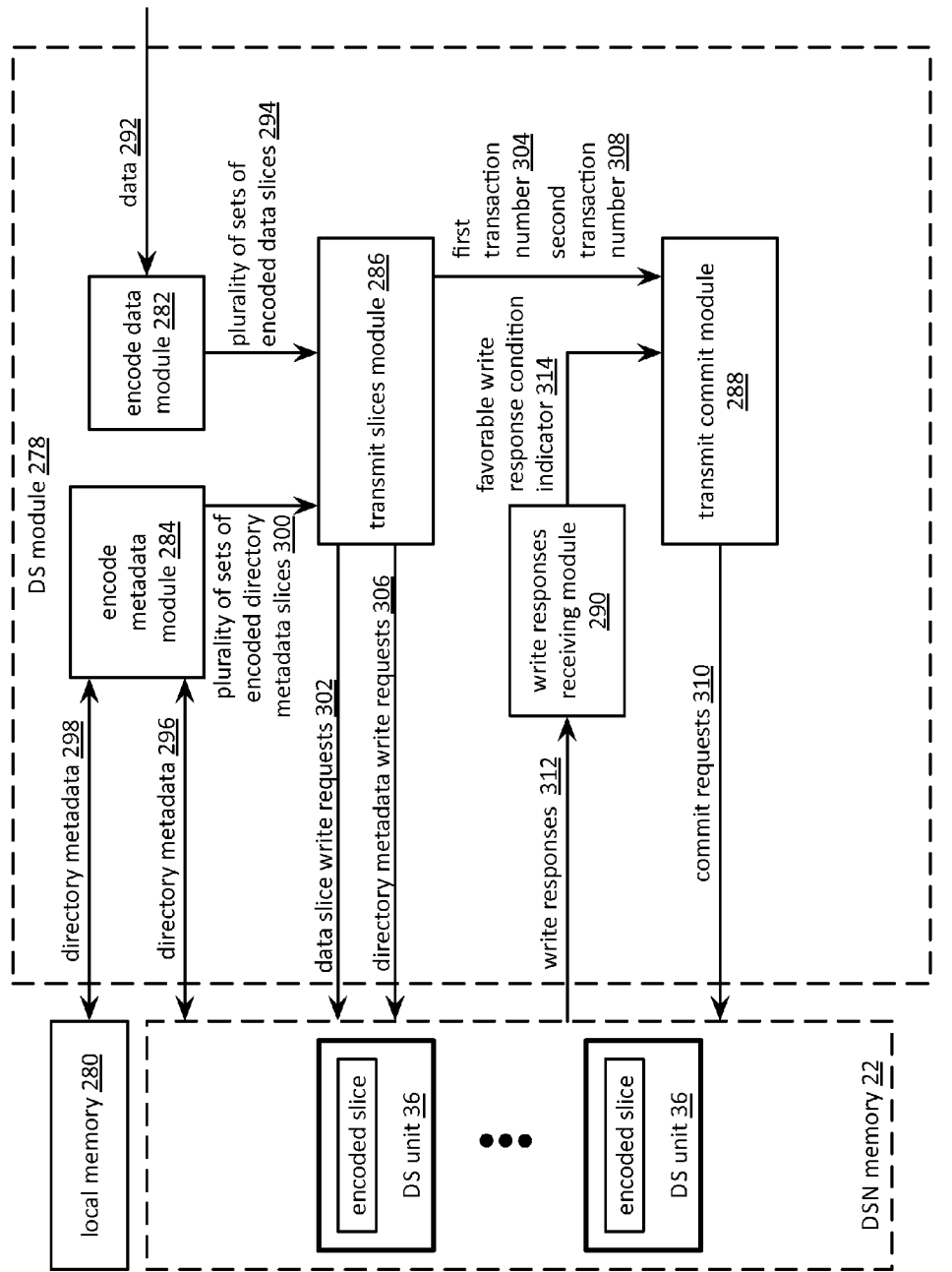
FIG. 14B is a block diagram of a storing module in accordance with the invention.

FIG. 14B is a block diagram of a dispersed storage (DS) module that operates within one or more DS units to store data in accordance with the method described in FIG. 14A. The DS module 278 includes an encode data module 282, an encoded metadata module 284, a transmit slices module 286, a transmit commit module 288, and a write response receiving module 290. The modules 282-290 may be separate modules, may be sub-modules of another module, and/or a combination thereof.

The encode data module 282 dispersed storage error encodes data 292 (e.g., retrieved data, received data, generated data) to produce a plurality of sets of encoded data slices 294. The encode metadata module 284 updates directory metadata regarding storing the data 292 as the plurality of sets of encoded data slices 294 in a dispersed storage network (DSN) memory 22 (e.g., in at least one dispersed storage (DS) unit 36) to produce updated directory metadata and dispersed storage error encoding the updated directory metadata to produce a plurality of sets of encoded directory metadata slices 300.

The encode metadata module 284 is operable to update the directory metadata by retrieving the directory metadata 296 and/or 298 from the DSN memory 22 (e.g., directory metadata 296) and/or a local memory 280 (e.g. directory metadata 290). The updating further includes determining DSN memory storage location information for the plurality of sets of encoded data slices. The DSN memory storage location information includes one or more of: a source name corresponding to a DSN memory storage location, a data size indicator, a data type indicator, snapshot information, a timestamp; and a segment allocation table, and modifying the directory metadata to include a filename associated with the data and the DSN memory storage location to produce the updated directory metadata.

The transmit slices module 286 facilitates transmitting one or more data slice write requests 302 to the DSN memory 22 regarding storing the plurality of sets of encoded data slices 294, wherein the one or more data slice write requests 302 includes a first transaction number 304 and facilitates transmitting one or more directory metadata write requests 306 to the DSN memory 22 regarding storing the plurality of sets of encoded directory metadata slices 300, wherein the one or more directory metadata write requests 306 includes a second transaction number 308. The transmit slices module 286 module is operable to transmit the one or more data slice write requests 302 by generating a set of data slice write requests, wherein each of the data slice write requests includes the first transaction number 304 regarding storage of a respective group of encoded data slices of the plurality of sets of encoded data slices 294 and transmitting the set of data slice write requests to a set of dispersed storage (DS) units of the DSN memory 22. The transmit slices module 286 is further operable to transmit the one or more data slice write requests 302 by generating a data slice write request, wherein the data slice write request includes the first transaction number 304 regarding storage of the plurality of sets of encoded data slices 294 and transmitting the set of data slice write requests to a set of dispersed storage (DS) units of the DSN memory 22, wherein a DS unit 36 of the set of DS units is targeted to store a respective group of encoded data slices of the plurality of sets of encoded data slices 294.

The transmit commit module 288 transmits one or more commit requests 310 to the DSN memory 22, when a favorable write response condition exists (e.g., receiving a favorable write response condition indicator 314), for at least one of: the one or more data slice write requests and the one or more directory metadata write requests, to commit storage of at least one of: the plurality of sets of encoded data slices 294 and the plurality of sets of encoded directory metadata slices 300, wherein the commit request 310 includes the first transaction number 304 and the second transaction number 308. The transmit commit module 288 is operable to transmit one or more commit requests 310 by one of generating a common commit request as the one or more commit requests to include a common first transaction number and a common second transaction number regarding committing storage of the plurality of sets of encoded data slices 294 and the plurality of sets of encoded directory metadata slices 300 and generating a group of commit requests as the one or more commit requests 310, wherein a commit request of the group of commit requests includes a unique first transaction number and a unique second transaction number regarding committing storage of a respective group of encoded data slices of the plurality of sets of encoded data slices 294.

The write response receiving module 290 facilitates receiving at least a threshold number of data slices write responses 312 regarding the one or more data slice write requests 302 and generating a commit request as the one or more commit requests 310 and/or facilitates receiving at least a threshold number of directory metadata write responses 312 regarding the one or more directory metadata write requests 306 and generating the commit request. The receiving at least the threshold number of data slices write responses 312 may include generating the favorable write response condition indicator 314 when the at least the threshold number of data slices write responses 312 are received.

Alternatively, or in addition to, the write response receiving module 290 facilitates at least one of receiving at least a first threshold number of data slices write responses 312 regarding writing a first set of encoded data slices of the plurality of sets of encoded data slices 294 and generating a first commit request as one of the one or more commit requests 310, receiving at least a first threshold number of directory metadata write responses 312 regarding writing a first set of encoded directory metadata slices of the plurality of sets of encoded directory metadata slices 300 and generating the first commit request, and receiving at least a second threshold number of data slices write responses 312 regarding writing a second set of encoded data slices of the plurality of sets of encoded data slices 294 and generating a second commit request as a second one of the one or more commit requests 310.

Figure 15:
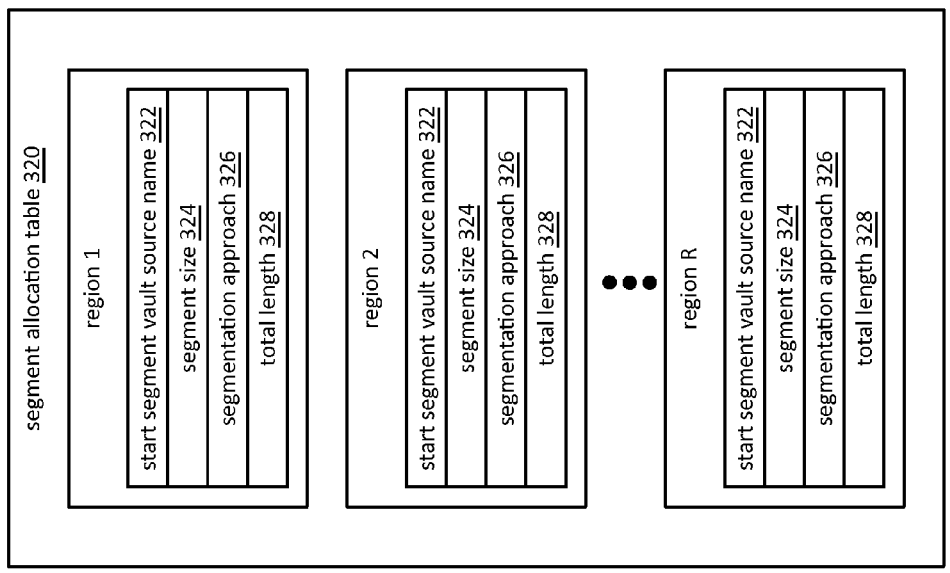
FIG. 15 is a diagram illustrating an example of a segmentation allocation table in accordance with the invention.

FIG. 15 is a diagram illustrating an example of a segmentation allocation table 320 (SAT) that includes a plurality of regions 1-R. Each region of the plurality of regions 1-R includes a start segment vault source name field 322, a segment size field 324, a segmentation approach field 326, and a total length field 328. The start segment vault source name field 322 includes a vault source name corresponding to a first data segment of a contiguous number of data segments that store data corresponding to a region. Alternatively, or in addition to, the start segment vault source name field 322 may include a file identifier (ID), a segment ID, a block ID and a file type indicator (e.g., block storage or file storage). The segment size field 324 includes a segment size entry corresponding to a number of bytes of each segment associated with the region.

The segmentation approach field 326 includes a segmentation approach indicator, which indicates what type of segmentation is utilized when segmenting data to produce the contiguous number of data segments associated with the region. For example, segment sizes of the contiguous number of data segments are substantially the same when the segmentation approach indicator indicates a flat or fixed approach. As another example, segment sizes of the contiguous number of data segments start small and ramp up when the segmentation approach indicator indicates a ramp up approach. As yet another example, segment sizes of the contiguous number of data segments start archer and ramp down when the segmentation approach indicator indicates a ramp down approach. In such ramping approaches, the segmentation approach field 326 may also include a starting segment size, a size increment number (e.g., the difference in size between segments), and a ramp up/down indicator. The total length field 328 includes a length indicator (e.g., a number of bytes) corresponding to an amount of data stored in the contiguous number of data segments that store data corresponding to the region. Alternatively, or in addition to, the total length field 328 may include a data total length indicator corresponding to an amount of data stored in all regions associated with the data.

The SAT may be stored in a local memory associated to enable access to a dispersed storage network (DSN) memory and/or as a SAT data segment in the DSN memory (e.g., as a set of encoded SAT slices). Note that a SAT vault source name is associated with the SAT when the SAT is stored in the DSN memory utilizing the SAT vault source name. At least one SAT associates data to one or more regions of contiguous data segments, wherein each data segment of the one or more contiguous data segments is stored as a set of encoded data slices in a dispersed storage network (DSN) memory. For example, an initial store of a file stuff.txt results in a first region stored in the DSN memory that includes four contiguous data segments of the initial data of stuff.txt and one data segment corresponding to the SAT. Next, a second store of more data of the file stuff.txt results in a second region stored in the DSN memory that includes four more contiguous data segments of appended data of stuff.txt and an updated SAT data segment. The SAT vault source name enables access to all of the encoded data slices associated with the data. The format of the vault source names of the SAT and the contiguous number of data segments is discussed in greater detail with reference to FIGS. 16A-C. A method to segment data and creating a SAT is discussed in greater detail with reference to FIG. 17.

FIG. 16A is a diagram illustrating an example of a slice name format. This listing format includes a slice name field 330. The slice name field 330 includes a slice index field 332 and a vault source name field 334. The slice index field 332 includes a slice index entry that may be utilized to produce a pillar number corresponding to a dispersed storage (DS) unit to store an associated encoded data slice. The vault source name field 334 includes a vault source name entry that includes a source name field 336 and a segment number field 338. The segment number field 338 includes a segment number entry that corresponds to a segment identifier (ID) for each segment associated with storing data and/or a segment allocation table (SAT). For example, segment number zero is associated with a SAT and segment number one is associated with a first segment of a contiguous number of segments associated with a first region of data. As a specific example, a region 1 SAT is assigned a source name of AAA and a segment number of 0 to produce a vault source name of AAA0 and an affiliated first segment of data is associated with the same source name of AAA and a segment number of 1 to produce a vault source name of AAA1. As another specific example, a region 2 SAT is assigned a source name of BBB and a segment number of 0 to produce a vault source name of BBB0 and an affiliated fifth segment of the data is associated with the source name of BBB and a segment number of 5 to produce a vault source name of BBB5.

The source name field 336 includes a source name entry that includes a vault ID field 340, a generation field 342, and an object number field 344. The vault ID field 340 includes a vault ID entry that associates a plurality of data as a group of data accessible when access to such a vault is enabled. The generation field 342 includes a generation entry that associates a subgroup of data associated with the vault ID. For example, successive generations may be added over time to organize data into multiple subgroups. The object number (e.g., a file ID) field 344 includes a object number entry that identifies the data and may be created based on one or more of a filename, a hash of the data, a hash of the filename, a user ID, a vault ID, and a random number.

FIG. 16B is a diagram illustrating an example of data segmentation that includes a segment allocation table (SAT) 320 and a plurality of consecutive segments 1-4 corresponding to initially storing data as a first region. In an example, the SAT 320 is stored in a dispersed storage network (DSN) memory at a vault source name address of AAA0. The SAT 320 includes a start segment vault source name field 322 with an entry of AAA1, a segment size field 324 entry of 100 bytes, a fixed segmentation approach field 326 entry of, and a total length field 328 entry of 340 bytes. Each of the segments 1-4 contains a maximum of 100 bytes in accordance with the segment size of 100 bytes as indicated in the SAT. Segments 1-3 each contain 100 bytes and segment 4 contains 40 bytes in accordance with the total length of 340 bytes as indicated by a total length entry of a total length field 328 of the SAT. Segment 1 is stored in the DSN memory at a vault source name address of AAA1 in accordance with the start segment vault source name AAA1 as indicated in the SAT. Segments 2-4 are stored in the DSN memory at vault source name addresses of AAA2-AAA4 in accordance with contiguous segment numbering.

FIG. 16C is a diagram illustrating another example of data segmentation that includes a segment allocation table (SAT) 320 a plurality of consecutive segments 5-8 corresponding to a second storing data as a second region (e.g., data appended to a first region). In an example, the SAT is stored in a dispersed storage network (DSN) memory at a vault source name address of BBB0. The SAT includes two regions, wherein a first region includes a start segment vault source name of AAA1, a segment size of 100 bytes, a fixed segmentation approach, and a total length of 340 bytes. The second region includes a start segment vault source name of BBB5, a segment size of 300 bytes, a fixed segmentation approach, and a total length of 1200 bytes. Each of the segments 5-8 contains a maximum of 300 bytes in accordance with the segment size of 300 bytes as indicated in the SAT. Segments 5-8 each contain 300 bytes in accordance with the total length of 1200 bytes as indicated in the SAT. Segment 5 is stored in the DSN memory at a vault source name address of BBB5 in accordance with the start segment vault source name BBB5 as indicated in the SAT. The segment number 5 is next sequentially after segment 4 of the first region as illustrated in FIG. 16B. Segments 5-8 are stored in the DSN memory at vault source name addresses of BBB5-BBB8 in accordance with contiguous segment numbering. A SAT associated with region 1 (e.g., as discussed with reference to FIG. 16B) may be deleted when the SAT associated with region 2 is stored, wherein the SAT associated with region 2 includes the region 1 information. Alternatively, the SAT includes information associated with region 2 and not with region 1.

Figure 17A:
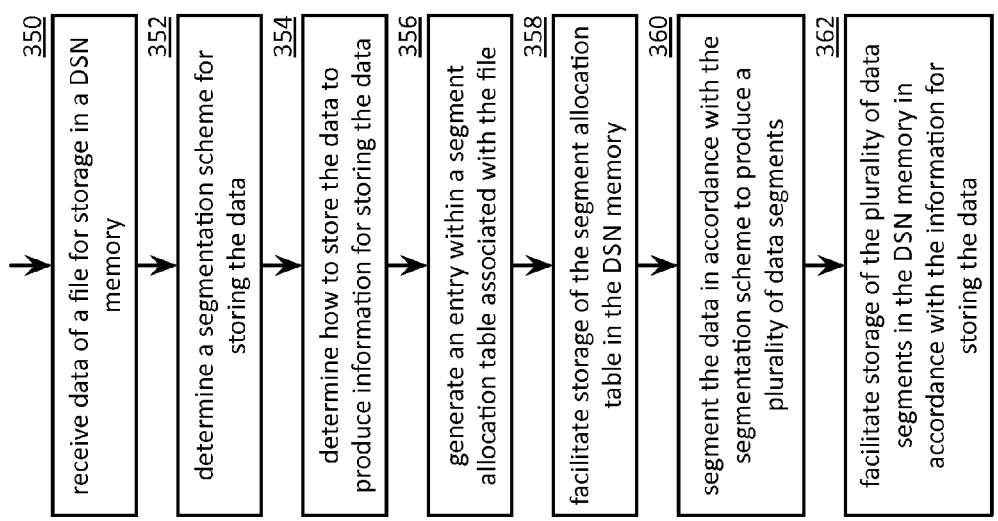
FIG. 17A is a flowchart illustrating an example of segmenting data in accordance with the invention.

FIG. 17A is a flowchart illustrating an example of segmenting data. The method begins with step 350 were a processing module (e.g., a dispersed storage (DS) module) receives data of a file for storage in a dispersed storage network (DSN) memory (e.g., new data of a new filename, additional data of an existing filename). The method continues at step 352 where the processing module determines a segmentation scheme for storing the data. The segmenting scheme includes a segment size (e.g., based on one or more of total length of the plurality of data segments and/or a next address) and a segmentation approach. For example, the segmenting scheme includes a fixed segmentation approach and a corresponding fixed segment size such that each of the plurality of data segments has a size no greater than the fixed segment size (e.g., when segment size=data size/number of segments). As another example, segmenting scheme includes a varying segmentation approach and an initial segment size such that a data segment of the plurality of data segments has a size corresponding to the initial segment size and remaining data segments of the plurality of data segments have a size based on the initial segment size and the varying segmentation approach. The determining the segmentation scheme is based on one or more of a previous segmentation scheme (e.g., a previous segmentation scheme utilized for storing other data associated with the data), a data size indicator, a data type indicator, a storage requirement, a vault identifier (ID), a lookup, a message, and a query.

The method continues at step 354 whether processing module determines how to store the data in accordance with the segmentation scheme to produce information for storing the data. The information for storing the data includes a start segment vault source name (e.g., an available address for a first data segment) and a total length of the data (e.g., based on one of a data size indicator, counting bytes). The method continues at step 356 for the processing module generates an entry within a segment allocation table associated with the file, wherein the entry includes the information for storing the data and the segmentation scheme.

The method continues at step 358 where the processing module facilitates storage of the segment allocation table in the DSN memory. The facilitating storage of the segment allocation table includes obtaining a segment allocation table vault source name (e.g., a directory lookup utilizing a filename of the data, generating a new source name when storing data of the file a first time), dispersed storage error encoding the segment allocation table to produce encoded table slices, and outputting the encoded table slices to the DSN memory for storage therein utilizing the segment allocation table vault source name. The method continues at step 360 where the processing module segments the data in accordance with the segmentation scheme to produce a plurality of data segments.

The method continues at step 362 where the processing module facilitates storage of the plurality of data segments in the DSN memory in accordance with the information for storing the data. The facilitating storage of the plurality of data segments in the DSN memory includes for each data segment of the plurality of data segments: dispersed storage error encoding the data segment to produce a set of encoded data slices; generating a set of slice names corresponding to the encoded data slices based on a start segment vault source name of the segment allocation table, wherein a common segment number of the set of slice names includes a sequentially increasing segment number (e.g., segments numbers of the data are associated with segment numbers that continue to increment by one); and sending the set of encoded data slices and the set of slice names to the DSN memory. Alternatively, or in addition to, the facilitating storage of the plurality of data segments in the DSN memory further includes for each data segment of the plurality of data segments: dispersed storage error encoding the data segment to produce a set of encoded data slices; generating a set of slice names corresponding to the encoded data slices based on a start segment vault source name of the segment allocation table, wherein an append marker field of the set of slice names includes a sequentially increasing append marker (e.g., append marker starts at zero for a first data section of a rally of data sections and sequentially increments by one for each data section as data is appended); and sending the set of encoded data slices and the set of slice names to the DSN memory.

Figure 17B:
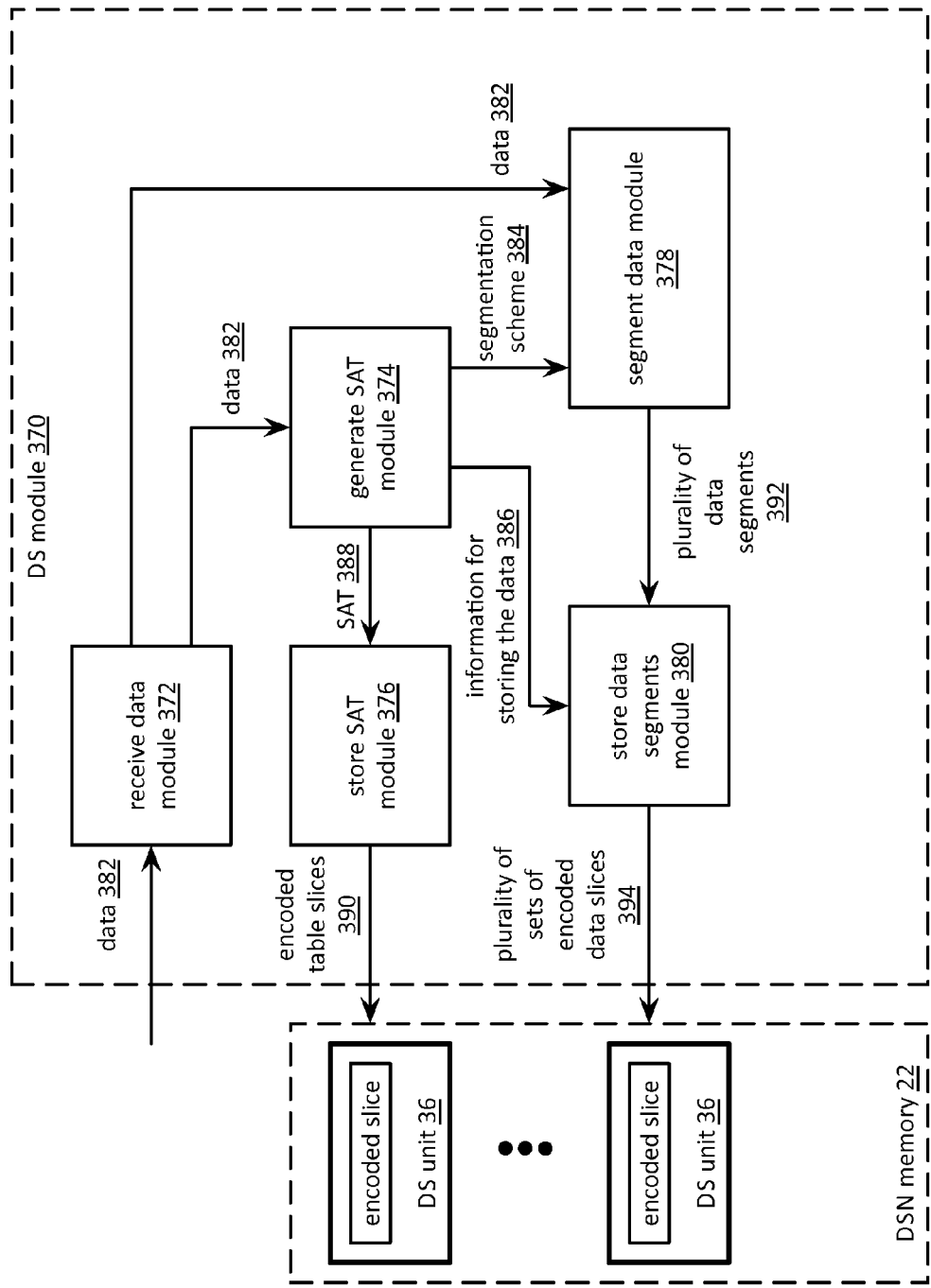
FIG. 17B is a block diagram of a segmenting module in accordance with the invention.

FIG. 17B is a block diagram of a dispersed storage (DS) module that operates within one or more DS units to segment data in accordance with the method described in FIG. 17A. The segmenting module 370 includes a receive data module 372, a generate segment allocation table (SAT) module 374, a store segment allocation table (SAT) module 376, a segment data module 378, and a store data segments module 380. The modules 372-380 may be separate modules, may be sub-modules of another module, and/or a combination thereof.

The received data module 372 receives data 382 of a file for storage in a dispersed storage network (DSN) memory 22. The generate segment allocation table module 374 determines a segmentation scheme 384 for storing the data, determines how to store the data in accordance with the segmentation scheme to produce information for storing the data 386, and generates an entry within a segment allocation table 388 associated with the file, wherein the entry includes the information for storing the data 386 and the segmentation scheme 384. The generate segment allocation table module 374 determines the segmentation scheme 384 based on one or more of a previous segmentation scheme, a data size indicator, a data type indicator, a storage requirement, a vault identifier (ID), a lookup, a message, and a query.

The store segment allocation table module 376 facilitates storage of the segment allocation table 388 in the DSN memory 22. The store segment allocation table module 376 facilitates storage of the segment allocation table 388 by obtaining a segment allocation table vault source name, dispersed storage error encoding the segment allocation table 388 to produce encoded table slices 390, and outputting the encoded table slices 390 to the DSN memory 22 for storage therein utilizing the segment allocation table vault source name.

The segment data module 378 segments the data 382 in accordance with the segmentation scheme 384 to produce a plurality of data segments 392. The store data segments module 380 facilitates storage of the plurality of data segments 392 in the DSN memory 22 in accordance with the information for storing the data 386. The store data segments module 380 facilitates storage of the plurality of data segments 392 in the DSN memory by for each data segment of the plurality of data segments 392: dispersed storage error encoding the data segment to produce a set of encoded data slices of a plurality of sets of encoded data slices 394; generating a set of slice names 394 corresponding to the encoded data slices based on a start segment vault source name of the segment allocation table, wherein a common segment number of the set of slice names includes a sequentially increasing segment number; and sending the set of encoded data slices and the set of slice names to the DSN memory 22.

Alternatively, or in addition to, the store data segments module 380 further facilitates storage of the plurality of data segments 392 in the DSN memory 22 by for each data segment of the plurality of data segments 392: dispersed storage error encoding the data segment to produce the set of encoded data slices of the plurality of sets of encoded data slices 394; generating the set of slice names corresponding to the encoded data slices based on a start segment vault source name of the segment allocation table, wherein an append marker field of the set of slice names includes a sequentially increasing append marker; and sending the set of encoded data slices and the set of slice names to the DSN memory 22.

FIG. 18 is a diagram illustrating an example of a directory file structure. The directory file 400 includes a file name field 402, a snapshot field 404, a segmentation allocation table (SAT) vault source name field 406, a modification timestamp field 408, a size field 400 and, a metadata field 412, and a content field 414. The file name field 402 includes a filename entry to indicate one or more of a file name, a file identifier (ID), a file number, a block number, and a block number range. The snapshot field 404 includes a snapshot entry to indicate a snapshot name that may be associated with the file name. Multiple snapshots may be associated with a common filename.

The SAT vault source name field 406 includes an entry to indicate either a non-association of a snapshot with a filename (e.g., when the field is zero) or an association of a snapshot with a filename by indicating a SAT vault source name associated with SAT that contains access information for the associated filename. For example, filename CS400.doc is associated with snapshots foo and bar but not snapshot root and a SAT vault source name is located at address BBB0 containing access information for the snapshots foo and bar to the file CS400.doc.

The modification timestamp field 408 includes a modification timestamp entry of a system timestamp value when the snapshot was created. For example, snapshot foo was created at timestamp t3 and snapshot bar was created at timestamp t6. The size field 410 includes a size entry to indicate a number of bytes of data of the file name. The metadata field 412 includes metadata associated with the file name and snapshot. The metadata may include one or more of directory metadata, a user ID, a vault ID, a data object and, a filename, a data type indicator, and a storage requirement. The content field 414 includes content entry such as a commonly accessed portion of the data associated with the file name. For example, the content field includes a reference table of keywords and locations in the filename CS400.doc.

Figure 19:
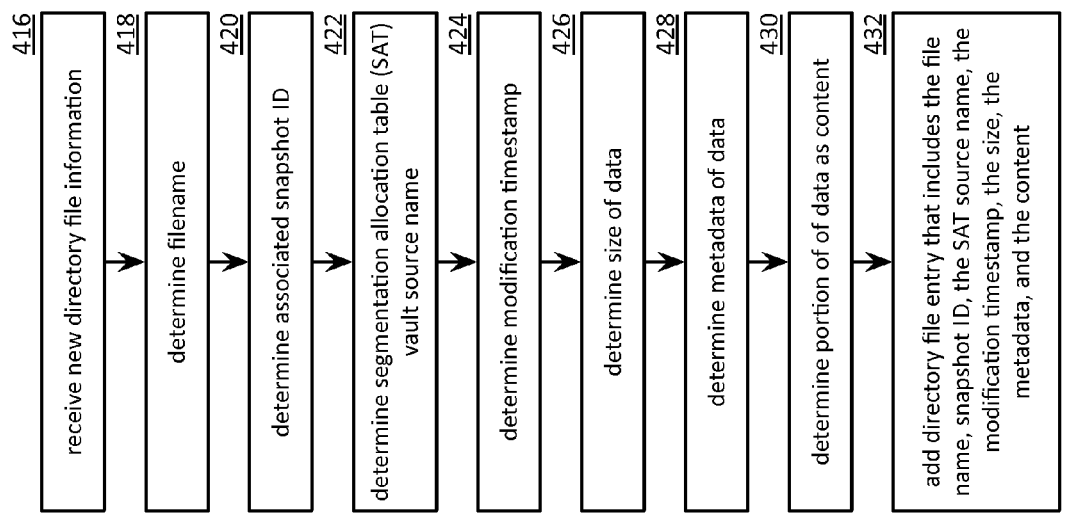
FIG. 19 is a flowchart illustrating another example of updating a directory in accordance with the invention.

FIG. 19 is a flowchart illustrating another example of updating a directory. The method begins with step 416 where a processing module (e.g., a dispersed storage (DS) processing unit, DS module, etc.) receives new directory file information (e.g., from a new file entry, from a new snapshot entry). The new directory file information includes one or more of a filename, a snapshot identifier (ID), a segmentation allocation table (SAT) vault source name, a data size indicator, metadata of data, data, and data content. The method continues at step 418 where the processing module determines a filename based on one or more of receiving the filename with the new directory file information, a lookup based on a reference of the new directory file information, and a predetermination.

The method continues at step 420 where the processing module determines an associated snapshot ID. The determination may be based on one or more of a received snapshot ID, a current snapshot ID indicator, and a snapshot ID pointer. For example, the processing module determines the snapshot ID to be foo when a current snapshot ID indicator indicates snapshot foo. The method continues at step 422 where the processing module determines a SAT vault source name (e.g., a directory lookup based on the filename).

The method continues at step 424 where the processing module determines a modification timestamp based on a current timestamp of a system (e.g., a real-time clock output). The method continues at step 426 where the processing module determines a size of data based on one or more of receiving a data size indicator and counting a number of bytes of data. The method continues at step 428 where the processing module determines metadata of the data based on one or more of received metadata of the data and local directory metadata.

The method continues at step 430 where the processing module determines a portion of the data as content. The determination may be based on one or more of received data content, identifying the portion of data based on a content pointer, a priority data indicator, summary data, and a data index. The method continues at step 432 where the processing module creates a directory file entry that includes one or more of the filename, the snapshot ID, the SAT source name, the modification timestamp, the size, the metadata, and the content. Next, the processing module adds the directory file entry to a directory file. The processing module stores the directory file in a local memory and/or in a dispersed storage network (DSN) memory as a plurality of sets of encoded directory slices.

FIG. 20A is a diagram illustrating another example of a slice name structure. The slice name 440 includes a slice index field 332 and a vault source name field 442. The vault source name field 442 includes a source name field 336, an append marker field 444, and a segment number field 338. The append marker field 444 includes an append marker entry that may be utilized to indicate whether an associated segment is included in a first region (e.g., as an original write operation) or whether the associated segment is included in a region other than the first region (e.g., as an append operation). An append marker with a value of zero indicates the first region. An append marker with a value other than zero indicates a region other than the first region. For example, the append marker is assigned sequentially for each appended region (e.g., append marker 1 indicates region 2, append marker to indicates region 3, etc.). As another example, the append marker is assigned randomly when the append marker is nonzero. The segment number field 338 includes a segment number entry that corresponds to a segment identifier (ID) for each segment associated with storing data and/or a segment allocation table (SAT). For example, segment number zero is associated with a SAT and segment number one is associated with a first segment of a contiguous number of segments associated with a first region of data.

The source name field 336 includes a vault ID field 340, a generation field 342, and an object number field 344 (e.g., as previously discussed with reference to FIG. 16A). As a specific example, a region 1 SAT is assigned a source name of AA, and append marker of 0, and a segment number of 0 to produce a vault source name of AA00. An affiliated first segment of data that is associated with the same source name of AA is assigned an append marker of 0 and a segment number of 1 to produce a vault source name of AA01. As another specific example, a region 2 SAT is assigned a source name of AA when the second region is associated with the first region of source name AA, an append marker of 1 (e.g., indicating region 2 which is a region other than the first region), and a segment number of 0 to produce a vault source name of AA10. An affiliated fifth segment of the data that is associated with the source name of AA is assigned the append marker of 1 and a segment number of 5 to produce a vault source name of AA15.

FIG. 20B is a diagram illustrating another example of data segmentation that includes a segment allocation table (SAT) 446 a plurality of consecutive segments 1-4 corresponding to initially storing data as a first region. For example, the SAT 446 is stored in a dispersed storage network (DSN) memory at a vault source name address of AA00. An append marker is set to zero for the first region. The SAT 446 includes a start segment vault source name field 322 with an entry of AA01, a segment size field 324 with an entry of segment size of 100 bytes, a segmentation approach field 326 with an entry of a fixed segmentation approach, and a total length field 328 entry of 340 bytes. Segments 1-4 contains a maximum of 100 bytes in accordance with the segment size of 100 bytes as indicated in the SAT 446. Segments 1-3 each contain 100 bytes and segment 4 contains 40 bytes in accordance with the total length of 340 bytes as indicated in the SAT. Note that segment 1 is stored in the DSN memory at a vault source name address of AA01 in accordance with the start segment vault source name AA01 as indicated in the SAT 446. Segments 2-4 are stored in the DSN memory at vault source name addresses of AA02-AA04 in accordance with contiguous segment numbering.

FIG. 20C is a diagram illustrating another example of data segmentation that includes a segment allocation table (SAT) 448 a plurality of consecutive segments 5-8 corresponding to a second storing data as a second region (e.g., data appended to a first region). For example, the SAT 448 is stored in a dispersed storage network (DSN) memory at a vault source name address of AA10. An append marker is set to a nonzero value to indicate that the region is not a first region. The SAT 448 includes two regions, wherein a first region includes a start segment vault source name entry of AA01, a segment size entry of 100 bytes, a fixed segmentation approach, and a total length of 340 bytes.

The second region includes a start segment vault source name of AA15, a segment size of 300 bytes, a fixed segmentation approach, and a total length of 1200 bytes. Segments 5-8 contains a maximum of 300 bytes in accordance with the segment size of 300 bytes as indicated in the SAT. Segments 5-8 each contain 300 bytes in accordance with the total length of 1200 bytes as indicated in the SAT. Segment 5 is stored in the DSN memory at a vault source name address of AA15 in accordance with the start segment vault source name AA15 as indicated in the SAT. The segment number 5 is next sequentially after segment 4 of the first region as illustrated in FIG. 20B. Segments 5-8 are stored in the DSN memory at vault source name addresses of AA15-AA18 in accordance with contiguous segment numbering.

The append marker is set to a nonzero value indicating that the region is not the first region. A SAT associated with region 1 (e.g., as discussed with reference to FIG. 20B) may be deleted when the SAT associated with region 2 is stored, wherein the SAT associated with region 2 includes the region 1 information. Alternatively, the SAT includes information associated with region 2 and not with region 1.

Figure 21:
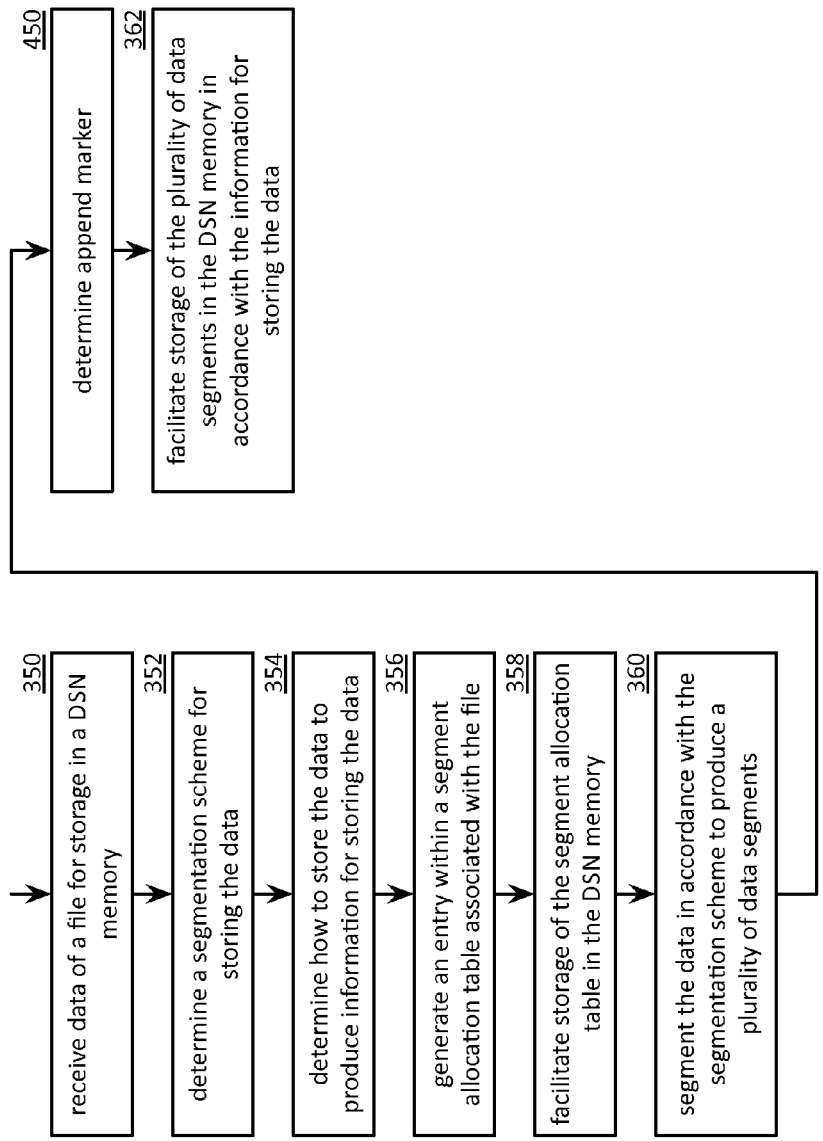
FIG. 21 is a flowchart illustrating another example of segmenting data in accordance with the invention.

FIG. 21 is a flowchart illustrating another example of segmenting data, which includes similar steps to FIG. 17A. The method begins with steps 350-360 of FIG. 17A where a processing module (e.g., of a dispersed storage (DS) processing unit) receives data of a file for storage in a dispersed storage network (DSN) memory, determines a segmentation scheme for storing the data, determines how to store the data to produce information for storing the data, generates an entry within a segment allocation table associated with the file, facilitates storage of the segment allocation table in the DSN memory, and segments the data in accordance with the segmentation scheme to produce a plurality of data segments.

The method continues at step 450 where the processing module determines an append marker for each vault source name of a plurality of vault source names corresponding to the plurality of data segments. The determination maybe based on one or more of a previous append marker incremented by one, a previous segmentation allocation table (SAT) vault source name, zero when no previous append marker exists, zero when the data is associated with a first write scenario, a random number, a received file name, and an append marker generation algorithm. For example, the processing module determines the append marker to be 5 when the previous append marker is 4. As another example, the processing module determines the append marker based on an output of a random number generator such that the append marker is nonzero. As yet another example, the processing module determines the append marker to be zero when the data for storage is a first write sequence (e.g., a first region). The method continues at step 362 of FIG. 17A where the processing module facilitates storage of the plurality of data segments in the DSN memory in accordance with the information for storing the data and the plurality of append markers.

Figure 22A:
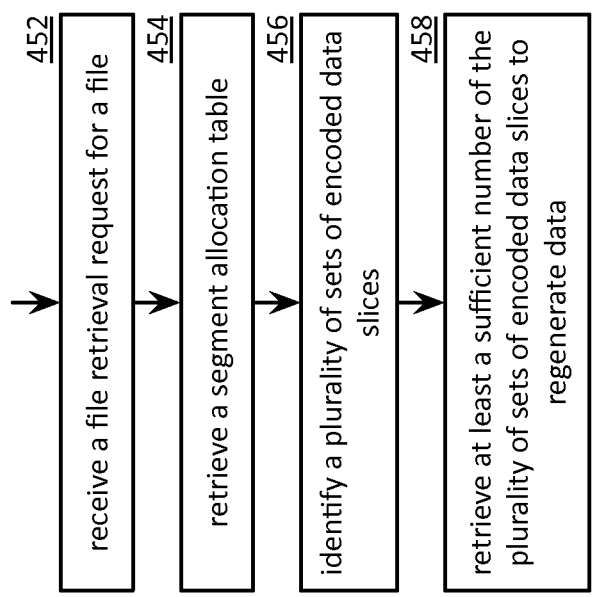
FIG. 22A is a flowchart illustrating an example of retrieving data in accordance with the invention.

FIG. 22A is a flowchart illustrating an example of retrieving data. The method begins with step 452 where a processing module (e.g., a dispersed storage (DS) processing module) receives a file retrieval request for a file, wherein the file includes one or more data regions, and wherein a data region of the one or more data regions is divided into a plurality of data segments and stored as a plurality of sets of encoded data slices in a dispersed storage network (DSN) memory. The file retrieval request may include one or more of a vault source name, a data identifier (ID), a segmentation allocation table (SAT) vault source name, a filename, a data region ID, and a retrieval requirement.

The method continues at step 454 were the processing model retrieves a segment allocation table (SAT) based on the file retrieval request, wherein the SAT includes a plurality of entries, and wherein an entry of the plurality of entries includes information regarding storing the data region in the DSN memory and a segmentation scheme regarding the dividing of the data region into the plurality of data segments. For example, the processing module retrieves a SAT vault source name from a directory utilizing a filename of the file, generates SAT slice names based on the SAT slice names, sends a plurality of read requests to the DSN memory that includes the SAT slice names, receives SAT slices, and decodes the SAT slices to reproduce the SAT.

The method continues at step 456 where the processing module identifies the plurality of sets of encoded data slices based on the segmentation scheme and the information regarding storing the data region. The identifying the plurality of sets of encoded data slices includes identifying the plurality of data segments based on the segmentation scheme and identifying the plurality of sets of encoded data slices based on the plurality of data segments and the information regarding storing the data region.

Alternatively, or in addition to, identifying the plurality of sets of encoded data slices further includes extracting a start segment vault source name and a total length of the data region from the information regarding storing the data region; extracting a segment size and a segmentation approach from the segmentation scheme; generating a plurality of segment vault source names for the plurality of data segments based on the start segment vault source name, the total length of the data region, the segment size, and the segmentation approach (e.g., varying a segment number field of the plurality of segment vault source names for each segment, wherein a total number of segments is determined by dividing the total length by the segment size); and generating a plurality of sets of slices names for the plurality of sets of encoded data slices based on the plurality of segment vault source names (e.g., varying a slice index field for each pillar).

The method continues at step 458 where the processing module retrieves at least a sufficient number of the plurality of sets of encoded data slices to regenerate the data region. Such a sufficient number includes retrieving at least a decode threshold number of encoded data slices per set of the plurality of sets of encoded data slices. For example, the processing module facilitates sending a plurality of sets of read requests to the DSN memory that includes the plurality of sets of slice names, receives at least a decode threshold number of encoded data slices per set of the plurality of sets of encoded data slices, decodes each decode threshold number of encoded data slices per set of the plurality of sets of encoded data slices to reproduce a corresponding data segment of the plurality of data segments, and aggregates the plurality of data segments to reproduce the data region.

Alternatively, or in addition to, the processing module identifies a second entry of the segment allocation table corresponding to a second data region of the one or more data regions, wherein the second entry includes second information regarding storing the second data region in the DSN memory and a second segmentation scheme regarding the dividing of the second data region into a second plurality of data segments; identifies a second plurality of sets of encoded data slices based on the second segmentation scheme and the second information regarding storing the second data; and retrieves at least a sufficient number of the second plurality of sets of encoded data slices to regenerate the second data region.

Alternatively, or in addition to, the processing module receives the file retrieval request, wherein the file includes a plurality of data regions as the one or more data regions; identifies corresponding entries of the plurality of entries in the segment allocation table for the plurality of data regions; identifies corresponding pluralities of sets of encoded data slices based on corresponding segmentation schemes and corresponding information regarding storing the corresponding data region from the corresponding entries; and retrieves at least a sufficient number of the corresponding pluralities of sets of encoded data slices to regenerate the file.

Figure 22B:
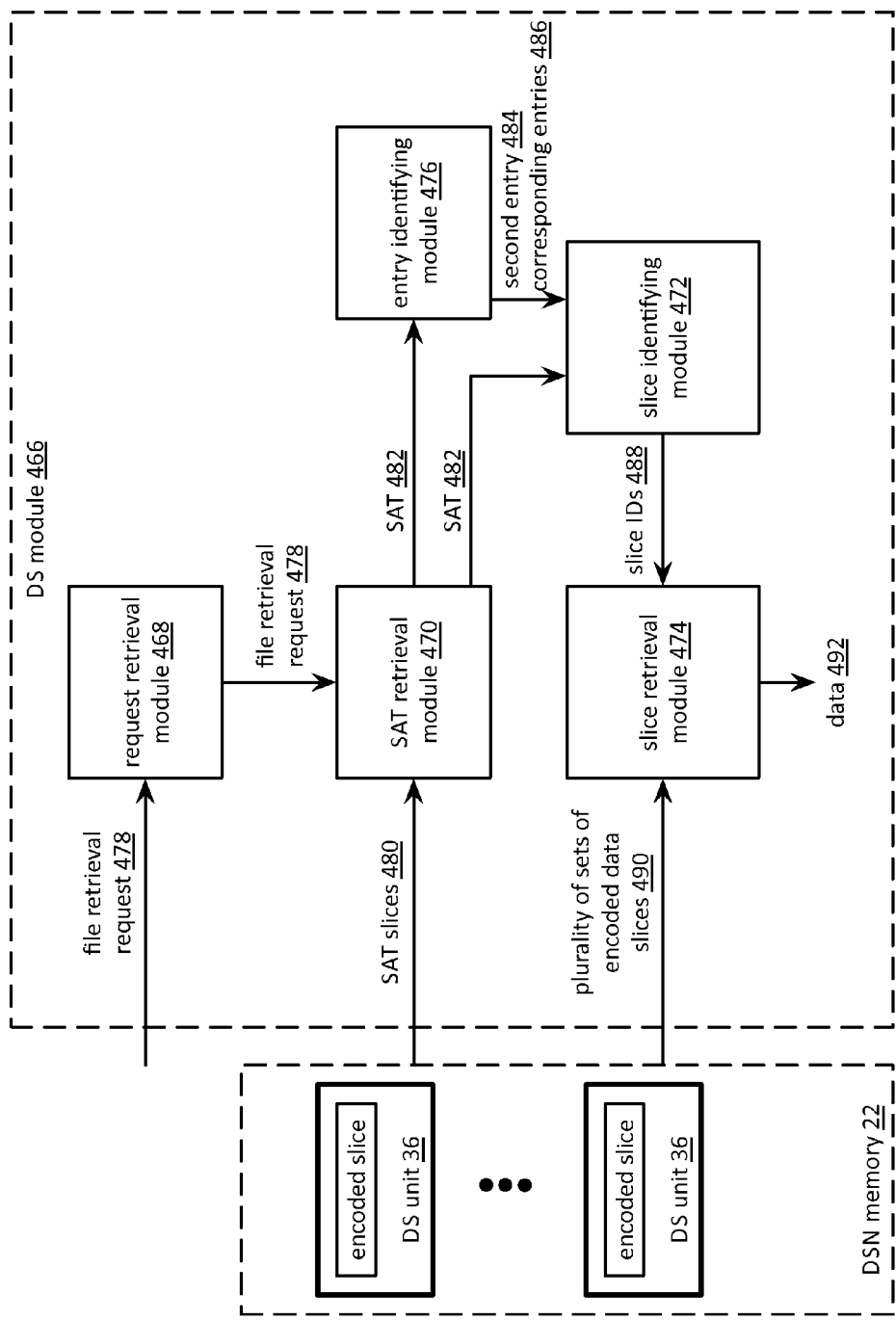
FIG. 22B is a block diagram of a reproduce data module in accordance with the invention.

FIG. 22B is a block diagram of a dispersed storage (DS) module within one or more DS units operable to reproduce data in accordance with the method described in FIG. 22A.

The DS module 466 includes a request retrieval module 468, a segment allocation table (SAT) retrieval module 470, a slice identifying module 472, a slice retrieval module 474, and an entry identifying module 476. The module 468-476 may be separate modules, sub-modules of another module, and/or a combination thereof.

The request retrieval module 468 facilitates receiving a file retrieval request 478 for a file (e.g., from a user device), wherein the file includes one or more data regions, and wherein a data region of the one or more data regions is divided into a plurality of data segments and stored as a plurality of sets of encoded data slices in a dispersed storage network (DSN) memory 22. Alternatively, or in addition to, the request retrieval module 468 facilitates receiving the file retrieval request 478, wherein the file includes a plurality of data regions as the one or more data regions.

The SAT retrieval module 470 facilitates retrieving a segment allocation table (SAT) 482 based on the file retrieval request 478. The SAT includes a plurality of entries, and wherein an entry of the plurality of entries includes information regarding storing the data region in the DSN memory 22 and a segmentation scheme regarding the dividing of the data region into the plurality of data segments. For example, the retrieve segment allocation table 470 retrieves a SAT vault source name from a directory utilizing a filename of the file, generates SAT slice names based on the SAT slice names, sends a plurality of read requests to the DSN memory 22 that includes the SAT slice names, receives SAT slices 480, and decodes the SAT slices 480 to reproduce the SAT 482.

The entry identifying module 476 identifies a second entry 484 of the segment allocation table 482 corresponding to a second data region of the one or more data regions. The second entry includes second information regarding storing the second data region in the DSN memory and a second segmentation scheme regarding the dividing of the second data region into a second plurality of data segments. The entry identifying module 476 further identifies corresponding entries 486 of the plurality of entries in the segment allocation table for the plurality of data regions when the request retrieval module 468 facilitates receiving the file retrieval request, wherein the file includes the plurality of data regions as the one or more data regions.

The slice identifying module 472 identifies the plurality of sets of encoded data slices as slice identifiers (IDs) 488 based on the segmentation scheme and the information regarding storing the data region. The slice identifying module 472 further identifies a second plurality of sets of encoded data slices as the slice IDs 488 based on the second segmentation scheme and the second information of the second entry 484 regarding storing the second data when the identify another entry module 476 identifies the second entry 484 of the segment allocation table. The slice identifying module 472 also identifies corresponding pluralities of sets of encoded data slices as the slice IDs 488 based on corresponding segmentation schemes and corresponding information regarding storing the corresponding data region from the corresponding entries 486 when the request retrieval module 468 facilitates receiving the file retrieval request, wherein the file includes the plurality of data regions as the one or more data regions.

The slice identifying module 472 is further operable to identify the plurality of sets of encoded data slices by identifying the plurality of data segments based on the segmentation scheme and identifying the plurality of sets of encoded data slices based on the plurality of data segments and the information regarding storing the data region. Alternatively, or in addition to, the slice identifying module 472 further identifies the plurality of sets of encoded data slices by extracting a start segment vault source name and a total length of the data region from the information regarding storing the data region; extracting a segment size and a segmentation approach from the segmentation scheme; generating a plurality of segment vault source names for the plurality of data segments based on the start segment vault source name, the total length of the data region, the segment size, and the segmentation approach; and generating a plurality of sets of slices names for the plurality of sets of encoded data slices based on the plurality of segment vault source names.

The slice retrieval module 474 facilitates retrieving at least a sufficient number of the plurality of sets of encoded data slices 490 to regenerate the data region 492. The slice retrieval module 474 also facilitates retrieving at least a sufficient number of the second plurality of sets of encoded data slices to regenerate the second data region when the identify another entry module 476 identifies the second entry 484 of the segment allocation table 482. The slice retrieval module 474 further facilitates retrieving at least a sufficient number of the corresponding pluralities of sets of encoded data slices to regenerate the file when the receive retrieval request module 468 facilitates receiving the file retrieval request, wherein the file includes the plurality of data regions as the one or more data regions.

Figure 22C:
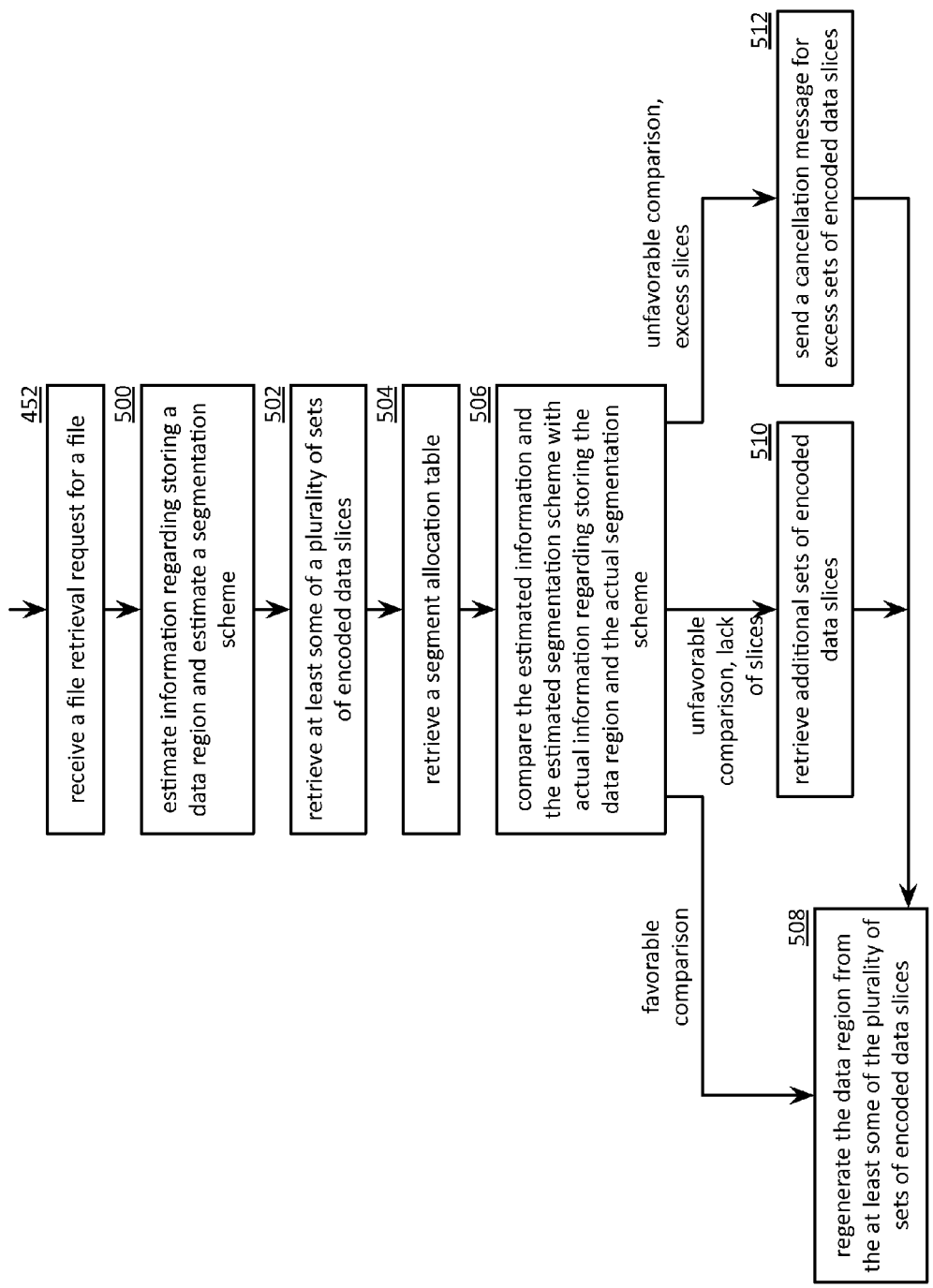
FIG. 22C is a flowchart illustrating another example of retrieving data in accordance with the invention.

FIG. 22C is a flowchart illustrating another example of retrieving data, which include similar steps to FIG. 22A. The method begins with step 452 of FIG. 22A where a processing module (e.g., of a dispersed storage (DS) processing unit, a DS module, etc.) receives a file retrieval request for a file, wherein the file includes one or more data regions, and wherein a data region of the one or more data regions is divided into a plurality of data segments and stored as a plurality of sets of encoded data slices in a dispersed storage network (DSN) memory.

The method continues at step 500 where the processing module estimates information regarding storing the data region in the DSN memory and a segmentation scheme regarding the dividing of the data region into the plurality of data segments to produce estimated information and an estimated segmentation scheme. For example, where the processing module estimates a first region start segment vault source name through an Nth segment vault source name to produce N first region segment vault source names. The determination maybe based on a first region SAT vault source name (e.g., retrieved from a DSN directory lookup based on a filename of the request) and a most recent SAT vault source name (e.g., from the request). For instance, the processing module estimates the first region start segment vault source name through the Nth segment vault source name as the first region SAT vault source name where an append marker is identical and a segment number is varied from 1 to N. In addition, the processing module may produce vault source names for other regions to enable a broader prefetch. For example, the processing module sets the append marker as a wildcard when establishing the vault source names.

The method continues at step 502 where the processing module retrieves at least some of the plurality of sets of encoded data slices based on the estimated segmentation scheme and the estimated information. The retrieving at least some of the plurality of sets of encoded data slices includes extracting a start segment vault source name and a total length of the data region from the estimated information; extracting a segment size and a segmentation approach from the estimated segmentation scheme; generating a plurality of segment vault source names for the plurality of data segments based on the start segment vault source name, the total length of the data region, the segment size, and the segmentation approach; and generating a plurality of sets of slices names for the at least some of the plurality of sets of encoded data slices based on the plurality of segment vault source names.

For example, the processing module sends a plurality of read requests messages to the DSN memory to recover a most recent SAT, a first region SAT, and at most N first region segments in a common prefetch operation. The plurality of read requests messages may include the most recent SAT vault source name, the first region SAT vault source name, and the N first region segment vault source names. At least some of the first region segment vault source names may not exist (e.g., due to the estimation) and hence the DSN memory can't respond with corresponding encoded data slices. The number N may be set to an estimated number of data segments to acquire during a prefetch operation prior to recovering an SAT with actual information with regards to a number of data segments associated with a data region.

The method continues at step 504 where the processing module retrieves a segment allocation table (SAT) based on the file retrieval request, wherein the SAT includes a plurality of entries, and wherein an entry of the plurality of entries includes actual information regarding storing the data region in the DSN memory and an actual segmentation scheme regarding the dividing of the data region into the plurality of data segments. The method continues at step 506 where the processing module compares the estimated information and the estimated segmentation scheme with the actual information regarding storing the data region and the actual segmentation scheme. For example, the processing module determines that there are more than N segments associated with the first region when the comparison indicates that an actual number of data segments is greater than an estimated number of data segments. As another example, the processing module determines that there is more than one data region (e.g., by extracting an entry associated with another region from the SAT).

The method continues at step 508 where the processing module regenerates the data region from the at least some of the plurality of sets of encoded data slices when the comparison is favorable. The method may retrieve additional sets of encoded data slices when another data region exists. When the comparison is unfavorable due to a lack of sets of encoded data slices, the method continues at step 510 where the processing module retrieves additional sets of encoded data slices based on a difference between the estimated information, the estimated segmentation scheme, the actual information regarding storing the data region, and the actual segmentation scheme. The method continues to step 508. When the comparison is unfavorable due to an excess of sets of encoded data slices, the method continues at step 512 where the processing module sends a cancellation message for the excess sets of encoded data slices based on a difference between the estimated information, the estimated segmentation scheme, the actual information regarding storing the data region, and the actual segmentation scheme. The method continues to step 508.

The method continues to process more data regions when the one or more data regions includes more than one data region. For example, for a second data region of the one or more data regions, the processing module estimates second information regarding storing the second data region in the DSN memory and a second segmentation scheme regarding dividing of the second data region into a second plurality of data segments to produce second estimated information and a second estimated segmentation scheme; retrieves at least some of a second plurality of sets of encoded data slices based on the second estimated segmentation scheme and the second estimated information; accesses a second entry of the segment allocation table, wherein the second entry includes second actual information regarding storing the second data region in the DSN memory and a second actual segmentation scheme regarding the dividing of the second data region into the second plurality of data segments; compares the second estimated information and the second estimated segmentation scheme with the second actual information regarding storing the data region and the second actual segmentation scheme; and when the comparison is favorable, regenerating the second data region from the at least some of the second plurality of sets of encoded data slices.

Figure 22D:
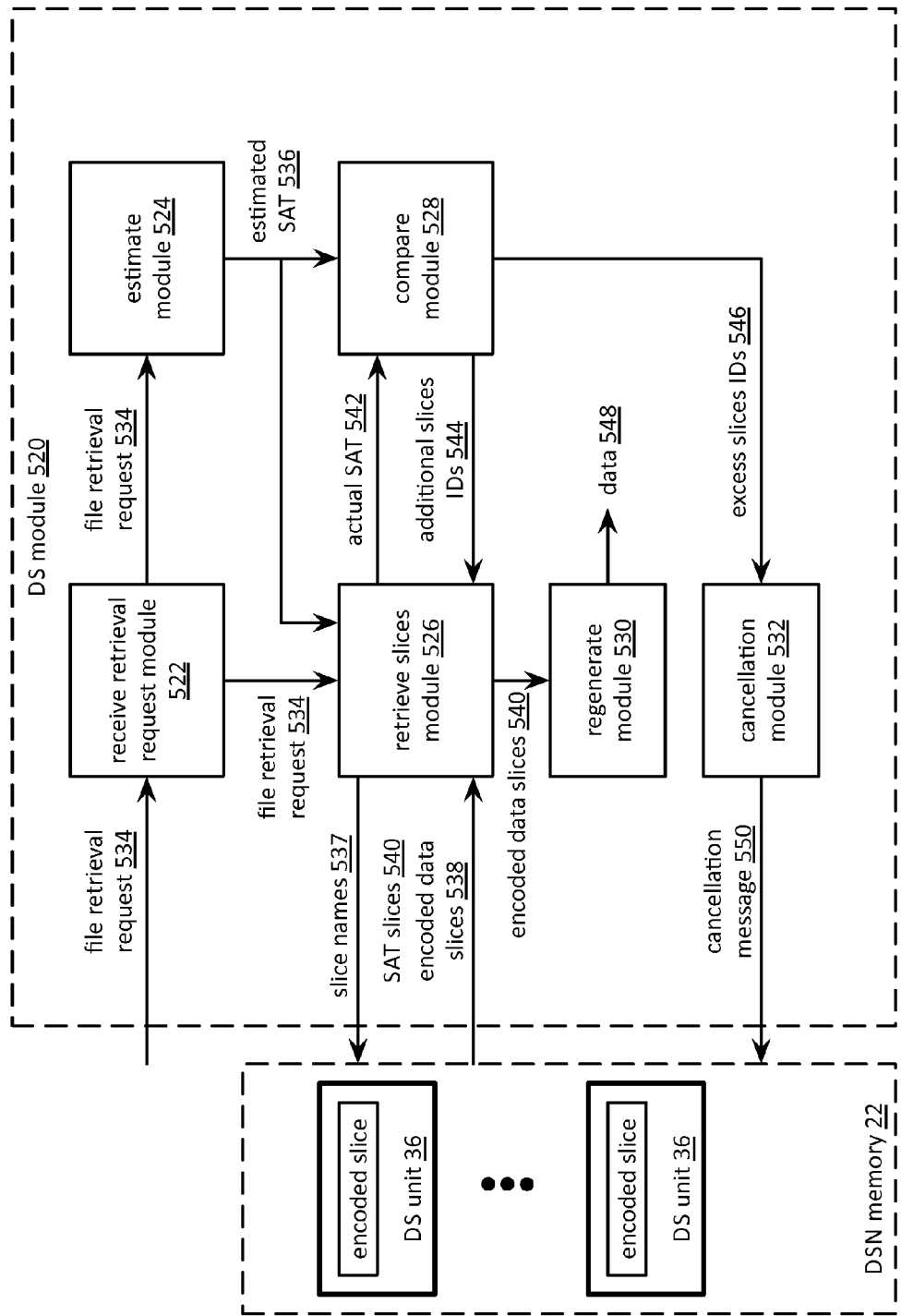
FIG. 22D is a block diagram of another reproduce data module in accordance with the invention.

FIG. 22D is a block diagram of a DS module operable within one or more DS units to reproduce data in accordance with the method described in FIG. 22C. The reproduce data module 520 includes a receive retrieval request module 522, an estimate module 524, a retrieve slices module 526, a compare module 528, a regenerate module 530, and a cancellation module 532. The modules 522-532 may be separate modules, may be sub-modules of another module, and/or a combination thereof.

The receive retrieval request module 522 facilitates receiving a file retrieval request 534 for a file, wherein the file includes one or more data regions, and wherein a data region of the one or more data regions is divided into a plurality of data segments and stored as a plurality of sets of encoded data slices in a dispersed storage network (DSN) memory 22. The estimating module 524 module estimates information regarding storing the data region in the DSN memory and a segmentation scheme regarding the dividing of the data region into the plurality of data segments to produce estimated information and an estimated segmentation scheme as an estimated segmentation allocation table (SAT) 536. The estimating module 524 module estimates second information regarding storing the second data region in the DSN memory 22 and a second segmentation scheme regarding dividing of the second data region into a second plurality of data segments to produce second estimated information and a second estimated segmentation scheme when retrieving a second data region of the one or more data regions.

The retrieve slices module 526 facilities retrieving at least some of the plurality of sets of encoded data slices 538 based on the estimated segmentation scheme and the estimated information of the estimated SAT 536 and facilitates retrieving an actual segment allocation table (SAT) 542 based on the file retrieval request 522 (e.g., by retrieving SAT slices 540), wherein the actual SAT 542 includes a plurality of entries, and wherein an entry of the plurality of entries includes actual information regarding storing the data region in the DSN memory 22 and an actual segmentation scheme regarding the dividing of the data region into the plurality of data segments. The retrieve slices module 526 facilitates retrieving at least some of a second plurality of sets of encoded data slices based on the second estimated segmentation scheme and the second estimated information and accessing a second entry of the segment allocation table, wherein the second entry includes second actual information regarding storing the second data region in the DSN memory 22 and a second actual segmentation scheme regarding the dividing of the second data region into the second plurality of data segments when retrieving a for second data region of the one or more data regions.

The retrieve slices module 526 retrieves at least some of the plurality of sets of encoded data slices 538 by extracting a start segment vault source name and a total length of the data region from the estimated information; extracting a segment size and a segmentation approach from the estimated segmentation scheme; generating a plurality of segment vault source names for the plurality of data segments based on the start segment vault source name, the total length of the data region, the segment size, and the segmentation approach; generating a plurality of sets of slices names 537 for the at least some of the plurality of sets of encoded data slices based on the plurality of segment vault source names; and sending a plurality of sets of encoded data slice requests to the DSN memory 22 that includes the plurality of sets of slice names 537.

The compare module 528 compares the estimated information and the estimated segmentation scheme of the estimated SAT 536 with the actual information regarding storing the data region and the actual segmentation scheme of the actual SAT 542. The compare module 528 compares the second estimated information and the second estimated segmentation scheme with the second actual information regarding storing the data region and the second actual segmentation scheme when retrieving a for second data region of the one or more data regions. For example, the compare module 528 outputs additional slices identifiers (IDs) 544 corresponding to remaining encoded data slices for retrieval when an unfavorable comparison indicates that there are more actual data segments than estimated. As another example, the compare module 528 outputs excess slice IDs 546 corresponding to excess slice names for retrieval cancellations when an unfavorable comparison indicates that there are fewer actual data segments than estimated.

The regenerate module 530 regenerates data 548 of the data region from the at least some of the plurality of sets of encoded data slices 540 when the comparison is favorable. The regenerate module 530 regenerates the second data region from the at least some of the second plurality of sets of encoded data slices when the comparison is favorable when retrieving a for second data region of the one or more data regions. The retrieve slices module 526 facilitates retrieving additional sets of encoded data slices utilizing the additional slices IDs 544 based on a difference between the estimated information, the estimated segmentation scheme, the actual information regarding storing the data region, and the actual segmentation scheme when a comparison is unfavorable due to a lack of sets of encoded data slices. Next, the regenerate module 530 regenerates the data 548 of the data region from the additional sets of encoded data slices.

The cancellation module 500 sends a cancellation message 550 to the DSN memory 22 for excess sets of encoded data slices based on a difference between the estimated information, the estimated segmentation scheme, the actual information regarding storing the data region, and the actual segmentation scheme when the comparison is unfavorable due to an excess of sets of encoded data slices. The DSN memory 22 may cancel sending any further encoded data slices associated with the data 548 to the retrieve slices module 526. Next, the regenerate module 530 regenerates the data 548 of the data region from the at least some of the plurality of sets of encoded data slices 540.

Figure 23:
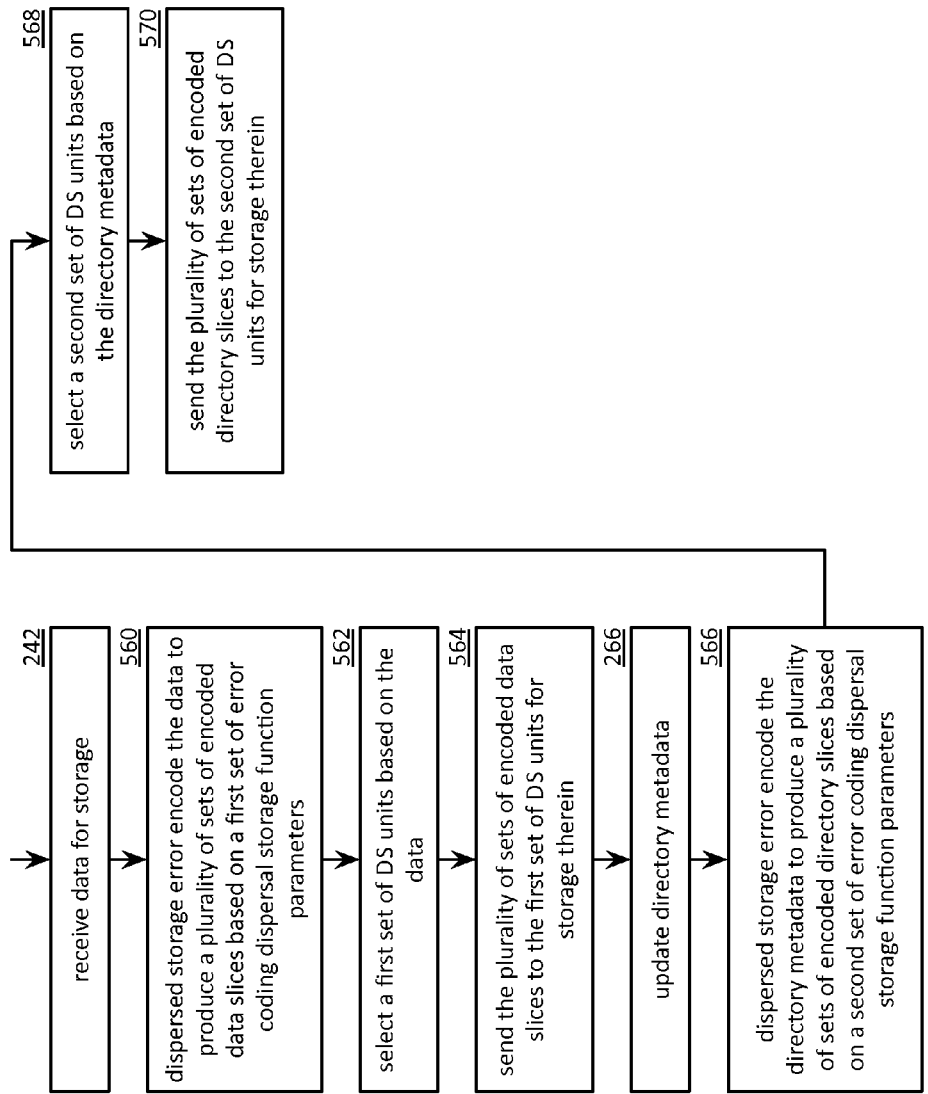
FIG. 23 is a flowchart illustrating another example of storing data in accordance with the invention.

FIG. 23 is a flowchart illustrating another example of storing data, which includes similar steps to FIGS. 13 and 14A. The method begins with step 242 of FIG. 13 where a processing module (e.g., of a dispersed storage (DS) processing unit) receives data for storage. The method continues at step 560 where the processing module dispersed storage error encodes the data to produce a plurality of sets of encode data slices utilizing a first set of error coding dispersal storage function parameters. The processing module may generate the first set of error coding dispersal storage function parameters based on storage requirements of the data. For example, the processing module generates the first set of error coding dispersal storage function parameters to include a relatively large difference between a pillar width number and a decode threshold number when storage requirements indicate a high level of reliability is required.

The method continues at step 562 where the processing module selects a first set of dispersed storage (DS) units based on the data. For example, the processing module selects the first set of DS units to match storage requirements and in accordance with the first set of error coding dispersal storage function parameters. For example, the processing module selects DS units 1-16 when DS units 1-16 are associated with favorable estimated reliability when the first set of error coding dispersal storage function parameters include a pillar width of 16 and a decode threshold of 10. The method continues at step 564 where the processing module sends the plurality of sets of encode data slices to the first set of DS units for storage therein. For example, the processing module sends a plurality of sets of write request messages to the first set of DS units that includes the plurality of sets of encoded data slices.

The method continues with step 266 of FIG. 14A where the processing module updates directory metadata based on the data. The method continues at step 566 where the processing module dispersed storage error encodes the directory metadata to produce a plurality of sets of encoded directory slices based on a second set of error coding dispersal storage function parameters. The processing module may generate the second set of error coding dispersal storage function parameters based on one or more of storage requirements of the data, the first set of error coding dispersal storage function parameters, the data, the directory metadata, storage requirements of the directory metadata, and a data type indicator. For example, the processing module generates the second set of error coding dispersal storage function parameters to include a relatively small pillar width and decode threshold number when the directory metadata storage requirements indicate a low access latency requirement.

The method continues at step 568 where the processing module selects a second set of DS units based on the directory metadata. For example, the processing module selects the second set of DS units to match directory metadata storage requirements and in accordance with the second set of error coding dispersal storage function parameters. For example, the processing module selects DS units 20-23 when DS units 20-23 are associated with favorable estimated access latency and when the second error coding dispersal storage function parameters include a pillar width of 4 and a decode threshold of 3. The method continues at step 570 where the processing module sends the plurality of sets of encoded directory slices to the second set of DS units for storage therein. For example, the processing module sends a plurality of sets of write request messages to the second set of DS units that includes the plurality of sets of encoded directory slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:
dispersed storage error encoding data to produce a plurality of sets of encoded data slices;
updating directory metadata regarding storing the data as the plurality of sets of encoded data slices in a dispersed storage network (DSN) memory to produce updated directory metadata;
dispersed storage error encoding the updated directory metadata to produce a plurality of sets of encoded directory metadata slices;
transmitting one or more data slice write requests to the DSN memory regarding storing the plurality of sets of encoded data slices, wherein the one or more data slice write requests includes a first transaction number;
transmitting one or more directory metadata write requests to the DSN memory regarding storing the plurality of sets of encoded directory metadata slices, wherein the one or more directory metadata write requests includes a second transaction number; and
when a favorable write response condition exists for both of the one or more data slice write requests and the one or more directory metadata write requests, transmitting one or more common commit requests to the DSN memory to commit storage of both of the plurality of sets of encoded data slices and the plurality of sets of encoded directory metadata slices, wherein the one or more common commit requests includes the first transaction number and the second transaction number.

2. The method of claim 1, wherein the transmitting the one or more data slice write requests comprises:
generating a set of data slice write requests, wherein each of the data slice write requests includes the first transaction number regarding storage of a respective group of encoded data slices of the plurality of sets of encoded data slices; and
transmitting the set of data slice write requests to a set of dispersed storage (DS) units of the DSN memory.

3. The method of claim 1, wherein the transmitting the one or more data slice write requests comprises:
generating a data slice write request, wherein the data slice write request includes the first transaction number regarding storage of the plurality of sets of encoded data slices; and
transmitting the set of data slice write requests to a set of dispersed storage (DS) units of the DSN memory, wherein a DS unit of the set of DS units is targeted to store a respective group of encoded data slices of the plurality of sets of encoded data slices.

4. The method of claim 1, wherein the updating the directory metadata comprises:
retrieving the directory metadata from at least one of the DSN memory and a local memory;
determining a DSN memory storage location information for the plurality of sets of encoded data slices, wherein the DSN memory storage location information includes one or more of: a source name corresponding to a DSN memory storage location, a data size indicator, a data type indicator, snapshot information, a timestamp; and a segment allocation table; and
modifying the directory metadata to include a filename associated with the data and the DSN memory storage location to produce the updated directory metadata.

5. The method of claim 1 further comprises one or more of:
receiving at least a threshold number of data slices write responses regarding the one or more data slice write requests and generating a commit request as the one or more commit requests; and
receiving at least a threshold number of directory metadata write responses regarding the one or more directory metadata write requests and generating the commit request.

6. The method of claim 1 further comprises one or more of:
receiving at least a first threshold number of data slices write responses regarding writing a first set of encoded data slices of the plurality of sets of encoded data slices and generating a first commit request as one of the one or more commit requests;
receiving at least a first threshold number of directory metadata write responses regarding writing a first set of encoded directory metadata slices of the plurality of sets of encoded directory metadata slices and generating the first commit request; and
receiving at least a second threshold number of data slices write responses regarding writing a second set of encoded data slices of the plurality of sets of encoded data slices and generating a second commit request as a second one of the one or more commit requests.

7. The method of claim 1, wherein the transmitting one or more common commit requests comprises one of:
generating a common commit request as the one or more common commit requests to include a common first transaction number and a common second transaction number regarding committing storage of the plurality of sets of encoded data slices and the plurality of sets of encoded directory metadata slices; and
generating a group of commit requests as the one or more common commit requests, wherein a commit request of the group of commit requests includes a unique first transaction number and a unique second transaction number regarding committing storage of a respective group of encoded data slices of the plurality of sets of encoded data slices.

8. A dispersed storage (DS) module comprises:
at least one memory;
a first module for dispersed storage error encoding data to produce a plurality of sets of encoded data slices;
a second module for:
updating directory metadata regarding storing the data as the plurality of sets of encoded data slices in a dispersed storage network (DSN) memory to produce updated directory metadata; and
dispersed storage error encoding the updated directory metadata to produce a plurality of sets of encoded directory metadata slices;
a third module for:
facilitating transmitting one or more data slice write requests to the DSN memory regarding storing the plurality of sets of encoded data slices, wherein the one or more data slice write requests includes a first transaction number; and
facilitating transmitting one or more directory metadata write requests to the DSN memory regarding storing the plurality of sets of encoded directory metadata slices, wherein the one or more directory metadata write requests includes a second transaction number; and a fourth module for transmitting one or more common commit requests to the DSN memory, when a favorable write response condition exists, for both of the one or more data slice write requests and the one or more directory metadata write requests, to commit storage of both of the plurality of sets of encoded data slices and the plurality of sets of encoded directory metadata slices, wherein the common commit request includes the first transaction number and the second transaction number.

9. The DS module of claim 8, wherein the third module is operable to transmit the one or more data slice write requests by:
generating a set of data slice write requests, wherein each of the data slice write requests includes the first transaction number regarding storage of a respective group of encoded data slices of the plurality of sets of encoded data slices; and
transmitting the set of data slice write requests to a set of dispersed storage (DS) units of the DSN memory.

10. The DS module of claim 8, wherein the third module is further operable to transmit the one or more data slice write requests by:
generating a data slice write request, wherein the data slice write request includes the first transaction number regarding storage of the plurality of sets of encoded data slices; and
transmitting the set of data slice write requests to a set of dispersed storage (DS) units of the DSN memory, wherein a DS unit of the set of DS units is targeted to store a respective group of encoded data slices of the plurality of sets of encoded data slices.

11. The DS module of claim 8, wherein the second module is operable to update the directory metadata by:
retrieving the directory metadata from at least one of the DSN memory and a local memory;
determining a DSN memory storage location information for the plurality of sets of encoded data slices, wherein the DSN memory storage location information includes one or more of: a source name corresponding to a DSN memory storage location, a data size indicator, a data type indicator, snapshot information, a timestamp; and a segment allocation table; and
modifying the directory metadata to include a filename associated with the data and the DSN memory storage location to produce the updated directory metadata.

12. The DS module of claim 8 further comprises:
a fifth module for at least one of:
receiving at least a threshold number of data slices write responses regarding the one or more data slice write requests and generating a commit request as the one or more commit requests; and
receiving at least a threshold number of directory metadata write responses regarding the one or more directory metadata write requests and generating the commit request.

13. The DS module of claim 8 further comprises:
a fifth module for at least one of:
receiving at least a first threshold number of data slices write responses regarding writing a first set of encoded data slices of the plurality of sets of encoded data slices and generating a first commit request as one of the one or more commit requests;
receiving at least a first threshold number of directory metadata write responses regarding writing a first set of encoded directory metadata slices of the plurality of sets of encoded directory metadata slices and generating the first commit request; and
receiving at least a second threshold number of data slices write responses regarding writing a second set of encoded data slices of the plurality of sets of encoded data slices and generating a second commit request as a second one of the one or more commit requests.

14. The DS module of claim 8, wherein the fourth module is operable to transmit one or more common commit requests by one of:
generating a common commit request as the one or more common commit requests to include a common first transaction number and a common second transaction number regarding committing storage of the plurality of sets of encoded data slices and the plurality of sets of encoded directory metadata slices; and
generating a group of commit requests as the one or more common commit requests, wherein a commit request of the group of commit requests includes a unique first transaction number and a unique second transaction number regarding committing storage of a respective group of encoded data slices of the plurality of sets of encoded data slices.

* * * * *